(12) United States Patent
Sorrentino et al.

(10) Patent No.: US 10,757,559 B2
(45) Date of Patent: Aug. 25, 2020

(54) DETECTION SEQUENCE FOR D2D COMMUNICATION

(71) Applicant: Telefonaktiebolaget LM Ericsson (publ), Stockholm (SE)

(72) Inventors: Stefano Sorrentino, Solna (SE); Ricardo Blasco Serrano, Espoo (FI); Hieu Do, Järfälla (SE); Yunpeng Zang, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 16/092,348

(22) PCT Filed: Apr. 28, 2017

(86) PCT No.: PCT/SE2017/050421
§ 371 (c)(1),
(2) Date: Oct. 9, 2018

(87) PCT Pub. No.: WO2017/192089
PCT Pub. Date: Nov. 9, 2017

(65) Prior Publication Data
US 2019/0132723 A1 May 2, 2019

Related U.S. Application Data

(60) Provisional application No. 62/322,398, filed on May 5, 2016.

(51) Int. Cl.
*H04W 72/04* (2009.01)
*H04W 8/00* (2009.01)
(Continued)

(52) U.S. Cl.
CPC ....... *H04W 8/005* (2013.01); *H04W 72/0446* (2013.01); *H04W 72/10* (2013.01);
(Continued)

(58) Field of Classification Search
CPC . H04W 8/005; H04W 72/10; H04W 72/0446; H04W 88/06; H04W 76/14; H04W 4/40; H04W 4/70
See application file for complete search history.

(56) References Cited

U.S. PATENT DOCUMENTS

2011/0051612 A1* 3/2011 Van Driest ........... H04B 1/7075
370/252
2012/0183095 A1* 7/2012 Gholmieh ............. H04L 5/0039
375/295

(Continued)

FOREIGN PATENT DOCUMENTS

WO WO-2014113537 A1 * 7/2014 ........... H04W 76/14
WO WO 2014113537 A1 7/2014

OTHER PUBLICATIONS

Shahid Mumtaz, IEEE Communications Magazine, "Cognitive vehicular communication for 5G", Year: 2015, vol. 53, Issue 7, Magazine Article, Publisher IEEE (Year: 2015).*

(Continued)

*Primary Examiner* — Lan-Huong Truong
(74) *Attorney, Agent, or Firm* — Sage Patent Group

(57) ABSTRACT

Method for D2D communication in a wireless device comprising receiving a D2D communication from another wireless device, the D2D communication comprising a first detection sequence of a plurality of detection sequences. Each detection sequence is associated with a respective different radio access technology or service type so that the first detection sequence identifies a radio access technology or service type associated with the D2D communication. The method also comprises selecting a transmission procedure for a D2D transmission from the second wireless device based on the first detection sequence, and performing the D2D transmission using the selected transmission procedure.

18 Claims, 14 Drawing Sheets

(51) Int. Cl.
*H04W 76/14* (2018.01)
*H04W 88/06* (2009.01)
*H04W 72/10* (2009.01)
H04W 4/70 (2018.01)
H04W 4/40 (2018.01)

(52) U.S. Cl.
CPC ........... *H04W 76/14* (2018.02); *H04W 88/06* (2013.01); *H04W 4/40* (2018.02); *H04W 4/70* (2018.02)

(56) References Cited

U.S. PATENT DOCUMENTS

| | | | | |
|---|---|---|---|---|
| 2012/0207040 | A1* | 8/2012 | Comsa | H04W 72/1215 370/252 |
| 2014/0321377 | A1* | 10/2014 | Ryu | H04W 72/1247 370/329 |
| 2014/0341018 | A1* | 11/2014 | Bhushan | H04W 56/002 370/230 |
| 2015/0215763 | A1* | 7/2015 | Ro | H04W 8/005 455/426.1 |
| 2016/0029331 | A1* | 1/2016 | Seo | H04W 56/002 370/350 |
| 2016/0142898 | A1* | 5/2016 | Poitau | H04W 76/14 370/329 |
| 2017/0064706 | A1* | 3/2017 | Patel | H04W 72/0446 |

OTHER PUBLICATIONS

International Search Report and Written Opinion, Patent Cooperation Treaty Application No. PCT/SE2017/050421, dated Nov. 7, 2017, 7 pages.
LG Electronics et al. New WI proposal: Support for V2V services based on LTE sidelink, 3GPP TSG RAN Meeting #70, RP-152293, Sitges, Spain, Dec. 7-10, 2015, 8 pages.
ETSI, Intelligent Transport Systems (ITS); Radiocommunications equipment operationg in the 5 855 Mhz to 5 925 MHz frequency band; Harmonised Standard covering the essential requirements of article 3.2 of Direction 2014/53/EU, Draft ETSI EN 302 571 v2.0.0 (Mar. 2016), 45 pages.
Tiirola, Esa et al. On the Design of Discovery Patterns for Half-Duplex TDD Nodes Operating in Frame-Based Systems, Poster Paper, Future Network & Mobile Summit 2013 Conference Proceedings, IIMC International Information Management Corporation, Jul. 3, 2013, 9 pages.
3GPP, 3$^{rd}$ Generation Partnership Project; Technical Specification Group Radio Access Network; Evolved Universal Terrestrial Radio Access (E-UTRA); Physical channels and modulation (Release 13), 3GPP TS 36.211 v13.1.0 (Mar. 2016), 155 pages.

* cited by examiner

DETECTION SEQUENCE FOR D2D COMMUNICATION

CROSS REFERENCE TO RELATED APPLICATIONS

This application is a 35 U.S.C. § 371 national stage application of PCT International Application No. PCT/SE2017/050421 filed on Apr. 28, 2017, which in turn claims domestic priority to U.S. Provisional Patent Application No. 62/332,398 filed on May 5, 2016, the disclosures and content of which are incorporated by reference herein in their entirety.

TECHNICAL FIELD

The disclosed subject matter relates generally to telecommunications and more particularly to certain approaches for a detection sequence for co-existence of primary and secondary services and technologies for D2D communication in a spectrum.

BACKGROUND

During 3GPP Release 12, the Long Term Evolution (LTE) standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application is direct communication based on physical channels terminated directly between devices. This new direct D2D interface is sometime designated as PC5, also known as sidelink at the physical layer.

One potential extension for the D2D work is support of vehicle-to-x (V2x) communication, which includes any combination of direct communication between vehicles, pedestrians and infrastructure. V2x communication may take advantage of a network (NW) infrastructure, when available, but at least basic V2x connectivity should be possible even in case of lack of coverage. Providing an LTE-based V2x interface may be economically advantageous because of the LTE economies of scale and it may enable tighter integration of communications between vehicles and the NW infrastructure (V2I), communications between vehicles and pedestrians (V2P), and vehicle-to-vehicle (V2V) communications, as compared to using a dedicated V2x technology. FIG. 1 is a schematic diagram illustrating V2x scenarios for an LTE-based Network.V2I may be provided over cellular LTE, providing wide area coverage and allowing for reuse of existing infrastructure. V2I may also be provided through Road Side Units (RSU) that are LTE pico-nodes. This allows for full integration with cellular LTE. V2V and V2P may either be provided over cellular LTE, which thus allows ITS services to be enabled for legacy smartphones, or over LTE-D2D providing radio-aware integration with cellular LTE.

V2x communications may carry both non-safety and safety information, where each of the applications and services may be associated with specific requirements sets, e.g., in terms of latency, reliability, capacity, etc.

DSRC (Dedicated Short Range Communications) is a two-way short- to medium-range wireless communications capability critical in communications-based active safety applications. It comprises wireless communication channels specifically designed for automotive use and a corresponding set of protocols and standards. The United States Federal Communications Commission (FCC) has allocated 75 MHz of spectrum in the 5.9 GHz band to be used by intelligent transportat systems (ITS) vehicle safety and mobility applications. IEEE 802.11p is an approved amendment to the IEEE 802.11 standard to add wireless access in vehicular environments. It defines enhancements to 802.11 (the basis of products marketed as Wi-Fi) required to support ITS applications. 802.11p is considered for DSRC.

European Telecommunications Standards Institute (ETSI) has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of less than or equal to 100 ms for most messages. However, the latency requirement for Pre-crash sensing warning is 50 ms.

The DENM message is event-triggered, such as by braking, and the availability of a DENM message is also checked for every 100 ms, and the requirement of maximum latency is less than or equal to 100 ms.

The package size of CAM and DENM message varies from 100+ to 800+ bytes and the typical size is around 300 bytes. The message is supposed to be detected by all vehicles in proximity.

The Society of the Automotive Engineers (SAE) also defined the Basic Safety Message (BSM) for DSRC with various messages sizes defined.

According to the importance and urgency of the messages, the BSMs are further classified into different priorities.

FIG. 2 is a block diagram illustrating spectrum allocation at 5 GHz. In Europe, 7×10 MHz channels are currently designated for ITS safety-related services in the 5875-5905 MHz band. In addition, 5905-5925 MHz is identified in ECC Decision (08)01 as potential extension band for ITS, and 5855-5875 MHz is recommended to be made available for ITS non-safety related applications through ECC Recommendation (08)01 ITS services are expected to be primary services deployed on such spectrum. Any other system that wishes allocation as secondary service would then need to ensure that it gives priority to such system. On the other hand, non-safety ITS is not of the same priority and it could potentially be co-primary allocated with other services.

Agenda Item 1.16 of the World Radiocommunication Conference 2019 (WRC-19) considers issues related to wireless access systems (WAS), including radio local area networks (RLAN), in the frequency bands between 5 150 MHz and 5 925 MHz, and take appropriate regulatory actions, including additional spectrum allocations to the mobile service, in accordance with Resolution COM6/22 (WRC-15); as a response, ECC has mandated European Conference of Postal and Telecommunications Administrations (CEPT) to do such compatibility studies. These are being included in ETSI TR 103 319.

Currently, the ETSI ITS standards consider DSRC technologies as the baseline for ITS. At the same time, a new Work Item (WI) has been approved in 3GPP to define LTE for ITS (both safety and non-safety), 3GPP RP-152293.

Both technologies are then of the same priority and will need to co-exist in the same spectrum. LBT Listen-Before-Talk (LBT) is defined in ETSI ITS, EN 302 571. Listen-Before-Talk in conjunction with preamble detection requires the device which wishes to transmit to listen to the channel and transmit if the measured level in such channel is below a pre-defined threshold.

In addition, TR 103 319 proposes the use of Preamble detection to allow RLAN devices to detect DSRC.

SUMMARY

An object of embodiments is to alleviate or at least reduce one or more of the above-mentioned problems, and to provide a solution allowing coexistence of different radio access technologies and service types in a spectrum for D2D communication. This object, and others, is achieved by methods and apparatus according to embodiments herein.

According to a first aspect, a method for Device-to-Device, D2D, communication is provided. The method is performed by a first wireless device and comprises selecting a first detection sequence from a plurality of detection sequences for the D2D communication. Each detection sequence of the plurality of detection sequences is associated with at least one of:

a. a respective different radio access technology of a plurality of radio access technologies so that the selected first detection sequence identifies one of the plurality of radio access technologies associated with the D2D communication, and b. a respective different service type of a plurality of service types so that the first detection sequence identifies one of the plurality of service types associated with the D2D communication.

The method further comprises transmitting the D2D communication to a second wireless device. The D2D communication comprises the selected first detection sequence.

According to a second aspect, a method for D2D communication performed by a second wireless device is provided. The method comprises receiving a D2D communication from a first wireless device. The D2D communication comprises a first detection sequence of a plurality of detection sequences, wherein each detection sequence of the plurality of detection sequences is associated with at least one of:

a. a respective different radio access technology of a plurality of radio access technologies so that the first detection sequence identifies a radio access technology of the plurality of radio access technologies associated with the D2D communication from the first wireless device, and b. a respective different service type of a plurality of service types so that the first detection sequence identifies a service type of the plurality of service types associated with the D2D communication from the first wireless device.

The method further comprises, based on the first detection sequence, selecting a transmission procedure for a D2D transmission from the second wireless device, and performing the D2D transmission using the selected transmission procedure.

According to other aspects, first and second wireless devices are provided. The wireless devices are configured for D2D communication and are adapted to perform the methods as described above.

One advantage of embodiments is that it provides a solution for coexistence of different radio access technologies and service types for D2D communication in a shared spectrum.

Other objects, advantages, and features of embodiments will be explained in the following detailed description when considered in conjunction with the accompanying drawings and embodiments.

BRIEF DESCRIPTION OF THE DRAWINGS

The accompanying drawings, which are included to provide a further understanding of the disclosure and constitute a part of this application, illustrate certain non-limiting embodiments of inventive concepts. In the drawings.

DETAILED DESCRIPTION

Figure 1:
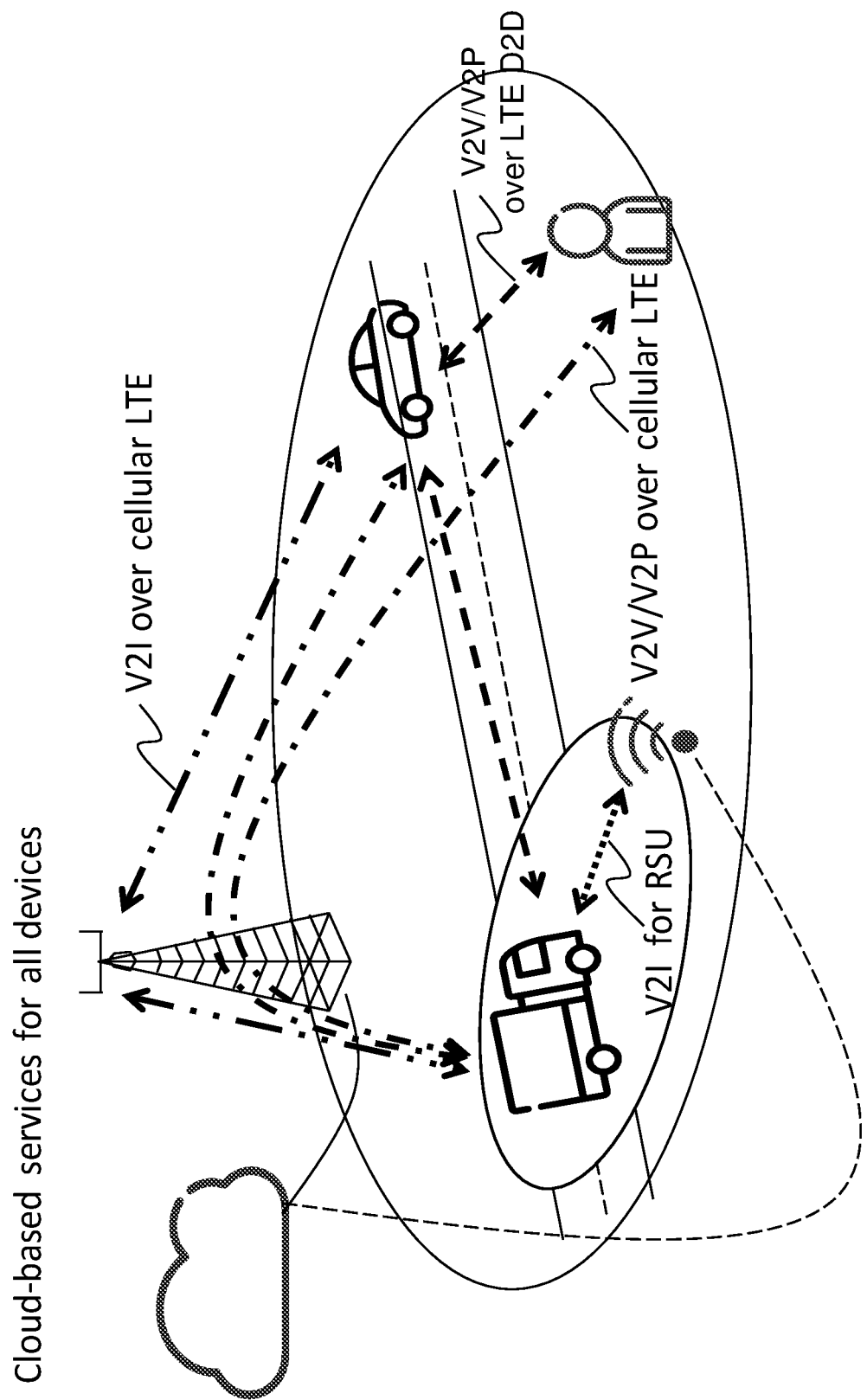
FIG. 1 is a schematic diagram illustrating V2x scenarios for an LTE-based Network NW.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive.

Components from one embodiment may be tacitly assumed to be present or used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Conventional technologies fail to adequately provide for co-existence between different ITS technologies. Moreover, co-channel access between LTE-ITS and IEEE 802.11p would not be fair towards LTE-ITS, as will be described hereinafter.

In a conventional coexistence framework (e.g., coexistence between IEEE WiFi and LTE-LAA) coexistence is achieved within a certain channel (i.e., a band, subband, carrier, etc.). The different technologies aim at Time Division Multiplexing (TDM) access of the channel by sensing the channel for predefined periods and accessing the channels opportunistically as soon as the channel is sensed "free" for a sufficient amount of time, and under certain additional rules. Such framework is only efficient if the access technologies use similar protocols for accessing the channel, in such a way that they would have similar chances to transmit in case of a short transmission opportunity. This is however not the case for e.g. LTE-ITS and IEEE standards for ITS such as IEEE 802.11p. While IEEE 802.11p has an opportunistic access scheme based on very short sensing periods and fast channel access, LTE-ITS has a slotted and much slower scheduling protocol which on the other hand enables higher resource efficiency. In other words, it is observed here that co-channel access between LTE-ITS and IEEE 802.11p would not be fair towards LTE-ITS and should be avoided.

Based on the above observations, a coexistence framework is defined that aims at dynamic splitting of channels between access technologies rather than at dynamic coexistence within a single channel or carrier. Such a framework is particularly suitable for the ITS case where multiple channels are defined.

With access technologies we refer to radio access protocols with different access schemes such as, e.g., IEEE 802.11p, 3GPP LTE-ITS, 3GPP LAA, 3GPP LTE, IEEE 802.11ac, 3GPP NR, etc.

Further, the framework enables prioritized access for certain services and/or technologies, depending e.g. on regulatory requirements.

The various alternative embodiments described herein, which may be combined in certain ways as will be appreciated by those skilled in the art, may potentially provide the following.

Mechanism for coexistence of multiple ITS technologies on safety ITS channels, e.g. PC5 transport for V2V services and DSRC/IEEE 802.11p services in the same channel.

Design of a detection sequence in terms of what and when to signal the detection sequence.

Methods for transmitting and receiving such detection sequences, i.e. for adapting transmitters and receivers to transmit and receive such detection sequences.

Preamble Design and Packet Detection in IEEE 802.11p

In the following we provide a detailed review of the IEEE 802.11p preamble design and of the detection technique that is commonly assumed for IEEE 802.11p devices.

A. Design of Preamble in IEEE 802.11p

Figure 3:
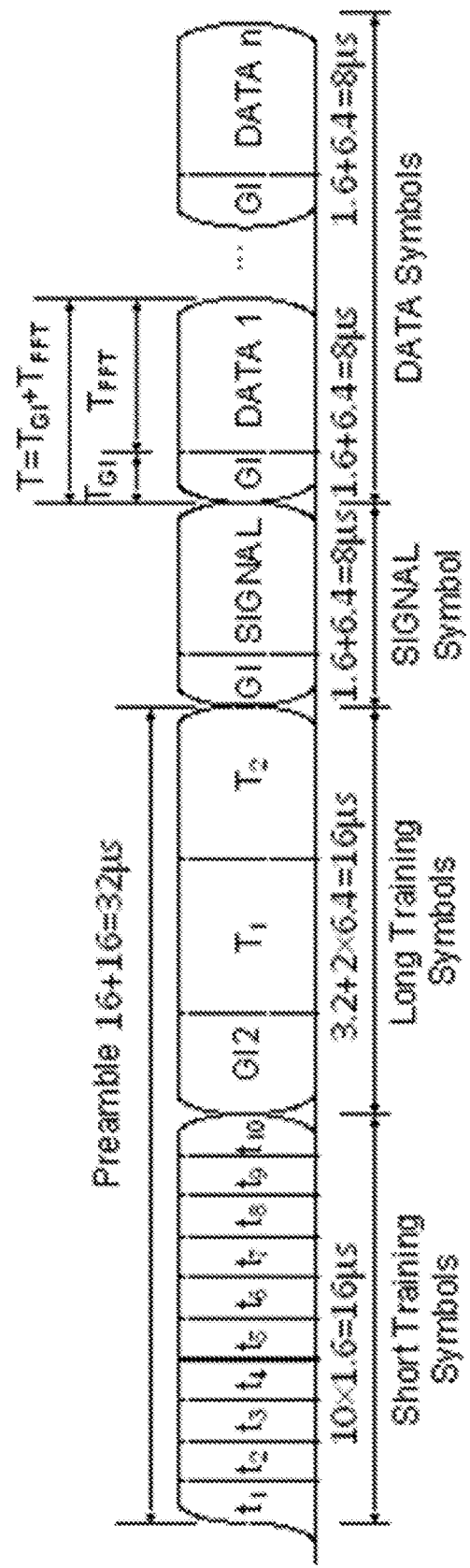
FIG. 3 is a diagram illustrating preamble design in IEEE 802.11 OFDM PHY.

FIG. 3 is a diagram illustrating preamble design/structure in IEEE 802.11p OFDM PHY (with timing information of 10 MHz channel spacing). The Physical Layer Convergence Procedure (PLCP) preamble consists of a short and a long training sequence. The first sequence is a repetition of ten identical short training symbols each of a length of 16 samples. The long training sequence consists of two identical long training symbols, each of a length of 64 samples, preceded by a 32-sample long cyclic prefix. The short training symbols are used for signal detection, Automatic Gain Control (AGC), diversity selection, coarse frequency offset, and timing synchronization. The sampling rate of IEEE 802.11p is 10 MHz.

B. Detection of Packet in IEEE 802.11p

Figure 4:
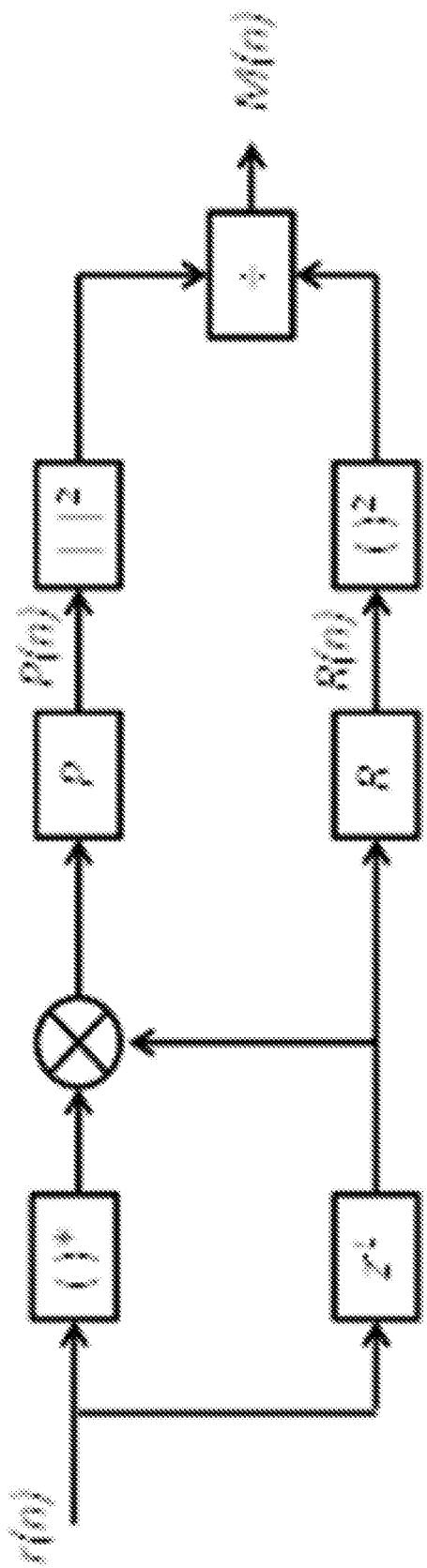
FIG. 4 is a delay-and-correlate algorithm for IEEE 802.11p packet detection.

A common way of IEEE 802.11p packet detection is to use the delay-and-correlate algorithm, which is shown in FIG. 4. The sliding window P in FIG. 4 calculates a correlation between the input signal r(n) and a version of the input signal delayed in time by L=16 samples, i.e. the length of one short training symbol in IEEE 802.11p.

$$P(n) = \sum_{m=0}^{L-1} (r^*_{n+m} \cdot r_{n+m+L}) \qquad (1)$$

The sliding window R in FIG. 4 calculates the received energy in the correlation interval:

$$R(n) = \sum_{m=0}^{L-1} |r_{n+m+L}|^2 . \qquad (1)$$

M(n) is the decision statistics:

$$M(n) = \frac{|P(n)|^2}{(R(n))^2} \qquad (3)$$

The decision metric can also be modified by the simplification:

$$M_{HW}(n) = \begin{cases} 1, & \text{if } |P(n)|^2 \geq \beta_{Th} \cdot (R(n))^2 \\ 0, & \text{otherwise} \end{cases} \qquad (4)$$

Where, $\beta_{Th}$ is the threshold for decision that usually takes the value 0.5. To detect a valid IEEE 802.11p preamble $M_{HW}(n)$ has to be 1 for at least 16 samples and stable (consecutive 1's) within 5 samples. The sampling rate for packet detection in IEEE 802.11p is 10 MHz.

Detection Sequences for LTE or Future 3GPP Radio Technologies

In 3GPP it has been highlighted that an LTE signal should be easily detectable by 802.11p devices with minor changes to their implementation. It is therefore suggested to have the following design guidelines for an LTE detection sequence:

Signal is generated using the typical sidelink transmitter chain

Similar used bandwidth as 802.11p signal (8.125 MHz)

Similar signal design (short repeating sequences) in order to enable reuse of typical 802.11p receivers Low cross correlation with 802.11p preamble Availability of multiple LTE-ITS detection sequences for differentiating different ITS services (e.g., safety and non-safety).

It is observed that the above requirements are probably not fulfilled by Sidelink Synchronization Signals (SLSS) or other Sidelink (SL) sequences. The suggestion is thus to instead provide a design of a new dedicated detection sequence as will be further described below.

Design of Detection Sequences

The following description distinguishes between primary and secondary UEs, although additional subcategories are not precluded. A primary UE is a UE participating in primary services on a given channel A secondary UE is a UE participating in secondary services on a given channel. The UEs can make use of the service by different technologies, such as LTE and 802.11p.

Figure 2:
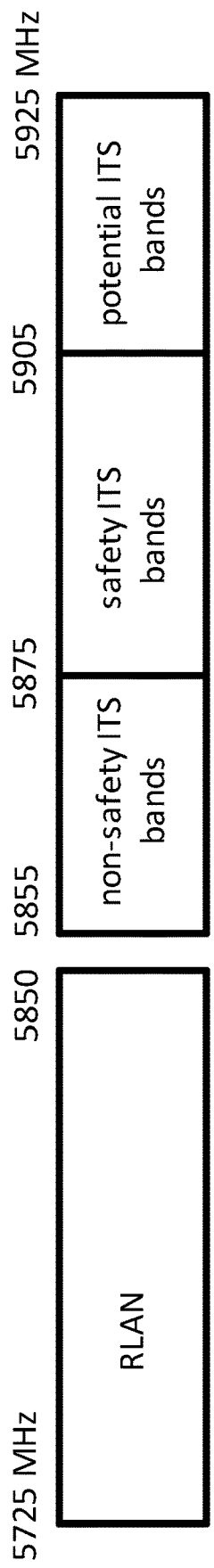
FIG. 2 is a block diagram illustrating spectrum allocation at 5 GHz.

Example of primary services are ITS safety related services. The channel may be in a band designated for ITS services (e.g., one of the channels in the 5850-5925 MHz band in EU as illustrated in FIG. 2). A secondary service could be a non-safety ITS service or non-ITS services. These are just examples and the same framework may be applied to any kind of services.

In some embodiments, primary UEs transmit periodic detection sequences to indicate to other UEs that they are accessing a certain carrier. With "periodic" we refer to signals that are transmitted with a certain time regularity. The detection sequences may alternatively be referred to as "service advertisement" signals or preamble sequences.

A 10 MHz system bandwidth is assumed in the following. However, the proposal can also be easily scaled for different system bandwidths as needed.

In one example embodiment the detection sequences are pre-defined according to a specification. The detection sequences may be differentiated for different levels of priority and/or types of service. E.g., different detection sequences can be used by UEs respectively providing ITS safety services (primary service) and ITS non-safety services (lower priority than safety-ITS). In one example, the detection sequences are also specific for a certain access technology (e.g., LTE-ITS). The detection sequences may be differentiated by use of specific sequences and/or specific resource mappings or any other transmission property/characteristic that would enable a receiver to discriminate between different detection sequences.

In a first example embodiment, a specific sequence (associated to a Zadoff-Chu root sequence or a pseudo-number generator initialization) or set of sequences is used to indicate a specific detection sequence. In this way a receiving UE can detect if a channel is used for a specific service or access technology.

In a second example embodiment, the detection sequence is differentiated by use of specific resource mappings. The detection sequences may be mapped to different radio resources as a function of the type of service and/or sequence transmitted by the UE. The detection sequences may e.g. be mapped to different symbols within a "LTE-ITS detection subframe", or different time and/or frequency resources. As one example, safety ITS UEs, i.e., UEs participating in ITS safety related services, or primary UEs may transmit the detection sequence on symbol one, and non-safety ITS UEs, i.e., UEs participating in ITS non-safety related services, or secondary UEs may transmit the detection sequence on symbol two. In one example, the primary service may be mapped to a first frequency band, e.g. 8 MHz of the available 10 MHz, and a secondary service may be mapped to the remaining frequency band, i.e. 2 MHz of the 10 MHz. This means that the detection sequence of the primary UE is transmitted within the first frequency band, and the detection sequence of the secondary UE is transmitted within the remaining frequency band of the 10 MHz, thus making it possible for the UE receiving the detection sequence to determine what service that a channel is used for.

In a third example embodiment, the detection sequence is differentiated by use of different delay offsets. This means that the repetition of the detection sequence may vary depending on the type of service. A repetition every 1 microsecond may e.g. be used for a primary service, and a repetition every 1.5 microsecond may be used for a secondary service. The advantage of this third embodiment is that the adaptation of a receiver architecture used in a IEEE 802.11p compatible system is small. Not so extensive adaptations are thus needed of the receiver in an IEEE 802.11p device to make it possible for it to detect detection sequences transmitted by a device of another technology on a common channel.

The first, second, and third example embodiments above could also be combined in any possible way.

Another aspect is to decide where to transmit the sequence, i.e. where in a transmission block or transmission interval. This is not obvious as different radio technologies use different transmission structures. The examples below are given for an LTE transmission structure but may be generalized to other transmission structures.

In one example embodiment, the detection sequence may be sent whenever a data packet is transmitted. Another alternative is to send the sequence when transmitting or broadcasting control data such as synchronization signals.

In another example embodiment, and regardless of if the detection sequence is transmitted in, or together with, a data or a control packet transmission, the detection sequence may be transmitted in a first Orthogonal frequency-division multiplexing (OFDM) symbol of a transmission interval or in a last OFDM symbol of the interval. The advantage with using the last OFDM symbol is that in D2D communication, the last symbol is not used. The UE is silent in order to create a guard period (GP), and the use of this symbol to transmit the detection sequence is thus straightforward. If using the first OFDM symbol, a bigger modification of the symbol is needed. However, although data is transmitted in the first OFDM symbol, the receiver is designed such that it may disregard the first symbol. The reason is that in D2D there is no power control, so the receiver needs to set the AGC during reception of the first symbol, and the first symbol may be lost due to that procedure.

Figure 5:
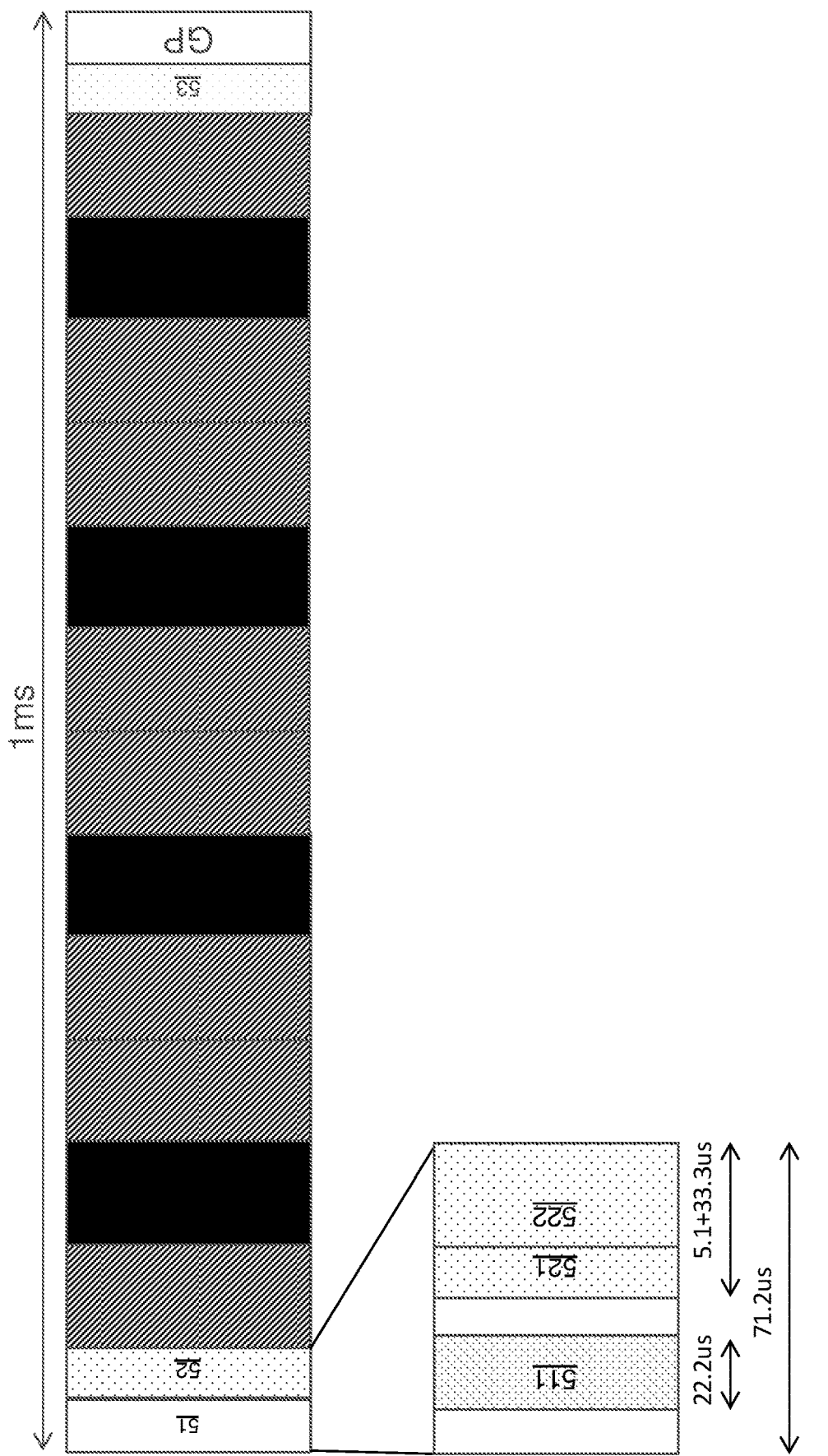
FIG. 5 illustrates transmission of preamble or detection sequence on a first part of a first OFDM symbol of an LTE subframe according to some embodiments of inventive concepts.
Figure 6:
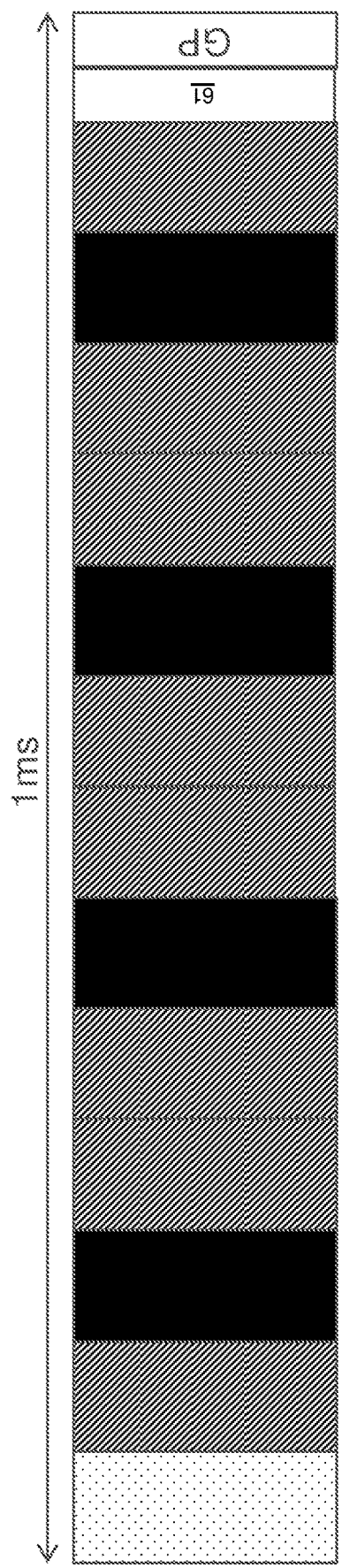
FIG. 6 illustrates transmission of preamble or detection sequence on a first part of the last OFDM symbol of an LTE subframe according to some embodiments of inventive concepts.

In any of the embodiments described above, the detection sequence may be sent in a first part of a symbol. In the second part of the symbol, either a shortened OFDM symbol is transmitted, or the second part of the symbol is left empty as a GP (for the case when the first OFDM symbol is used, see illustration in FIG. 5, for the case when the last OFDM symbol is used, see illustration in FIG. 6). In FIG. 5, the detection sequence 511 is transmitted in a first part 51 of the initial symbol, and a Cyclic Prefix (CP) 521 and a half-length first data symbol 522 is transmitted in the second part 52 of the initial symbol. In the final symbol of the subframe, a CP and a half-length last data symbol 53 is transmitted in a first part of the final symbol, and the rest of the symbol is left empty as a GP. In FIG. 6, the detection sequence is transmitted in a first part 61 of the final symbol of the subframe, and the rest of the symbol is left empty as a GP.

Figure 7:
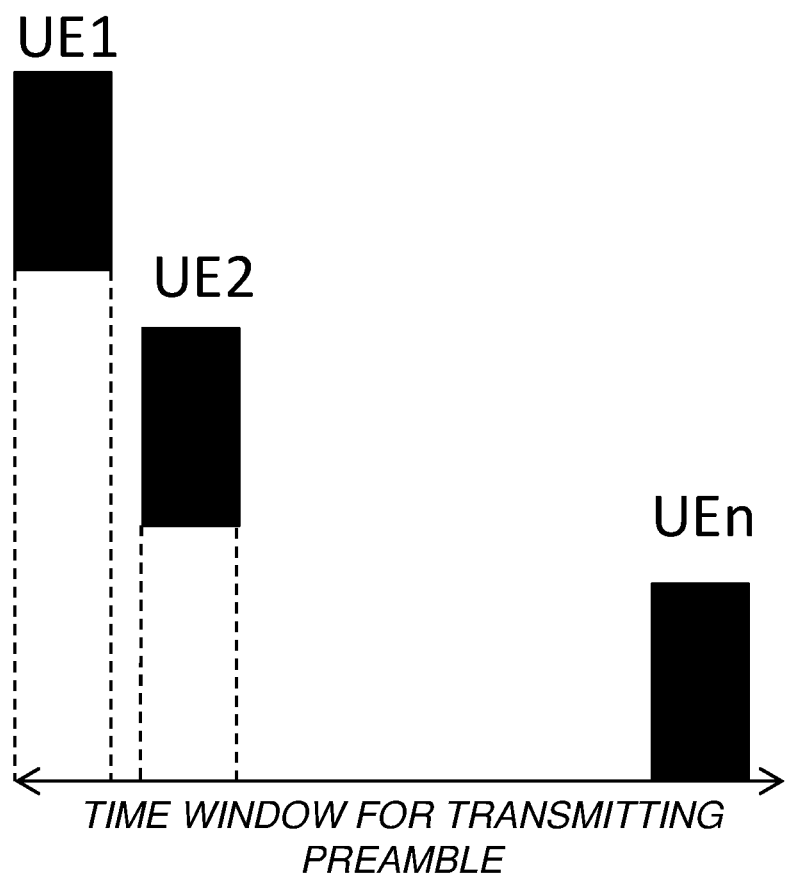
FIG. 7 illustrates mapping detection sequence from different UEs to different parts within time window to transmit preamble or detection sequence according to some embodiments of inventive concepts.

Furthermore, the transmission of the detection sequence may be performed in less than half an OFDM symbol. Therefore, it is possible to transmit it in different parts of this half OFDM symbol. A random or a UE-specific offset may be used to determine when within the allowed time window, i.e. for example within half of the OFDM symbol, that the detection sequence should be transmitted. UE1 may transmit its detection sequence within as first part of the time window corresponding to the half OFDM symbol, UE2 transmits in a next part, and so on as illustrated in FIG. 7. This is to avoid consistent interference between sequences from different UEs by creating some time offsets. Without the time offsets, many UEs may transmit the sequence at a same time but with different propagation delays, and the correlation at the receiver may fail so that the receiver may fail to detect the correlation in the signal.

As described above, one design option is to define a periodic configurable "LTE-ITS detection sequence resource", likely consisting of a periodic subframe. Due to overhead reasons the periodicity cannot be too high. One example would be a periodic subframe for transmitting detection sequences with a periodicity of some hundreds of ms. A lower periodicity will in turn increase the detection latency. It also seems wasteful to use a full subframe to transmit a sequence. Mapping from LTE-ITS detection sequence identities (ID) corresponding to different ITS service types, to specific symbols in the subframe may be considered for reducing inter-sequence interference.

One option is to transmit the LTE-ITS detection sequence as a preamble before each transmission. Since the preamble is only 22.2 microseconds, it can be accommodated in the first part of the first OFDM symbol, spanning e.g. the central 8.1 MHz as will be further discussed below. The second part of the first symbol includes the cyclic prefix (CP) and a half-length data symbol (generated with comb). That second symbol part may e.g. be used for AGC.

Transmitter and Receiver Adaptations

Figure 8:
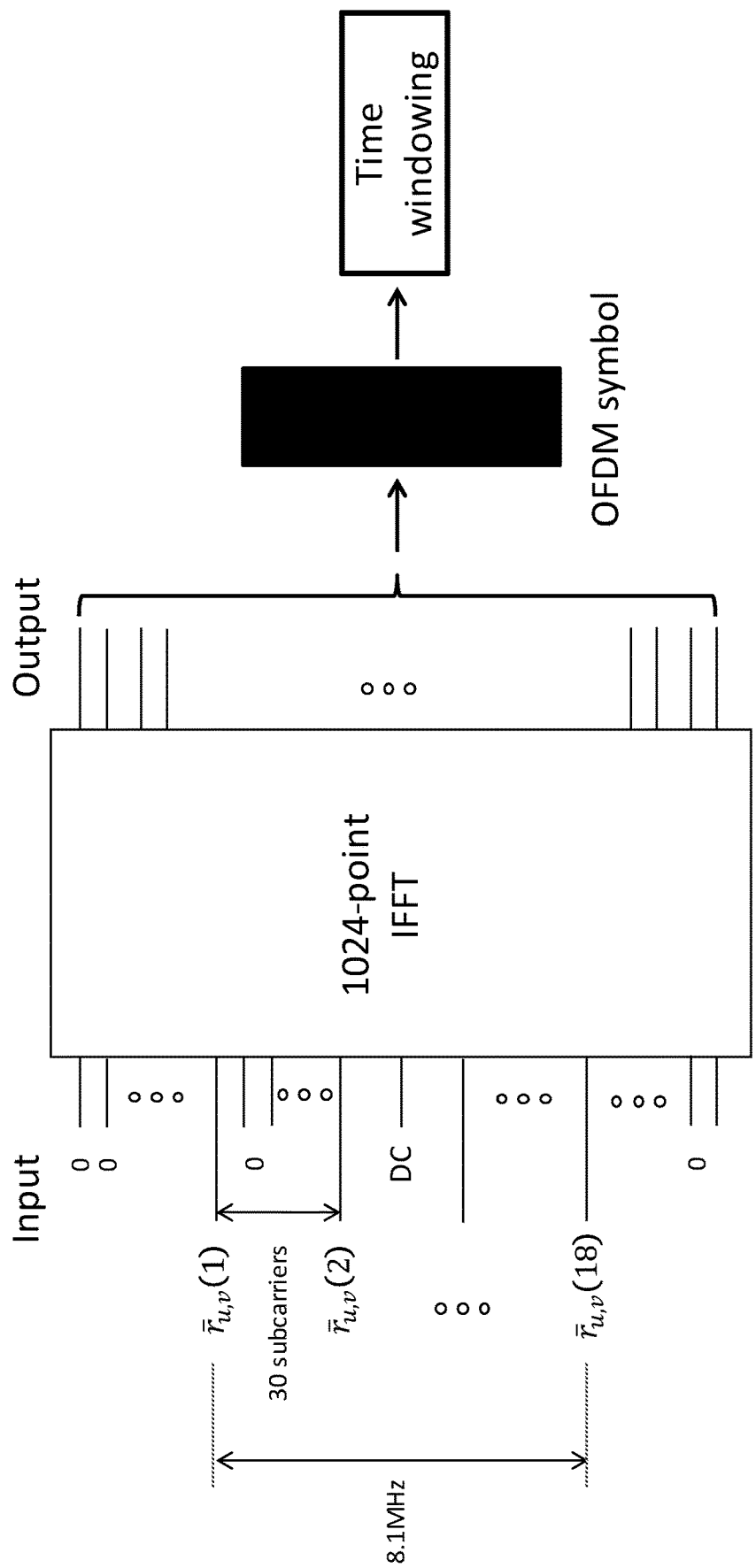
FIG. 8 illustrates sequence generation according to some embodiments of inventive concepts.

In embodiments of the invention, an LTE transmitter adapted for transmitting detection sequences according to some of the above described embodiments is provided. An illustration of the transmitter is given in FIG. 8. In the IFFT modulator, all subcarriers are set to zero except for some of them (e.g. one every $30^{th}$ subcarrier) set to base sequences $\bar{r}_{u,v}(n)$. This means that a signal is generated on the output with 30 repetitions. The transmitter may thus easily be adapted to generate a sequence with different repetition length and different spacing. It should be noted that the output may be time windowed, in order to create a signal fitting into only a part of the OFDM symbol and not a complete OFDM symbol. The transmitter is thus adapted to generate different detection sequences according to the third example embodiment described above, where the detection sequences are differentiated by use of different delay offsets. One advantage is that this may be done only by adapting the software of the ordinary LTE transmitter.

In the frequency domain, the sidelink detection sequences $r_{SDS}(m)$ are "comb"-versions of the base sequences $\bar{r}_{u,v}(n)$, $0 \le n \le M_{SC}^{RS}-1$ ($M_{SC}^{RS}$ is the length of the reference signal sequence) given in clause 5.5.1.2 of 3GPP TS 36.211 V13.1.0 (2016-03). The correct sequence to be transmitted by a UE (if any) is determined by higher layers and as explained above it depends on the type of service (e.g., safety, non-safety ITS) and other regional regulations outside of 3GPP scope. If two LTE-ITS detection sequences are considered, one for "safety" and one for "non-safety" (more sequences might be added in the future if needed), the following two sequences may be considered:

LTE-ITS detection sequence 1: u=0, v=0, $M_{SC}^{RS}$=18, comb mapping to every 30th subcarrier.

LTE-ITS detection sequence 2: u=0, v=0, $M_{SC}^{RS}$=15, comb mapping to every 35th subcarrier.

One advantage of differentiating LTE-ITS detection sequences by use of different delay offsets instead of different base sequences (u,v), is that the IEEE 802.11p Delay and Correlate detector is able to distinguish between such sequences.

A symmetrical mapping around the DC carrier seems like a natural option where the sidelink detection sequence occupies the central part of the system bandwidth. Since length-{15,18} base sequences are currently undefined in LTE, the current length-24 sequences are truncated for the sake of simulation and obtaining good enough results. Better sequences may be obtained by numerical search if justified.

The generated symbol is then truncated/windowed in time domain in order to span only 10 repetitions in time domain, i.e., respectively {22.2, 19.1} microseconds. CP is included in the repetitions.

Detection of LTE-ITS Sidelink Detection Sequence at IEEE 802.11p Receiver

To detect the LTE-ITS detection sequence, an IEEE 802.11p receiver may use the delay-and-correlate detector, whose structure is shown in FIG. 4, where the delay time is L=22 samples for LTE-ITS detection sequence 1 and L=19 for LTE-ITS detection sequence 2 instead of L=16 as for IEEE 802.11p preamble. The detection procedure and decision condition is described above. At the IEEE 802.11p receiver, the sampling rate for detecting LTE-ITS detection sequence is 10 MHz, i.e. identical to the sampling rate for IEEE 802.11p packet detection.

Simulation Results

It is foreseen that for coexistence between IEEE 802.11p and LTE-ITS sidelink an IEEE 802.11p receiver shall possess two delay-and-correlate detectors: one detector, named as detector A, with delay L=16 for IEEE 802.11p preamble detection, and the other, named as detector B, with L=22 for LTE-ITS safety sequence detection. Both detectors work in parallel and use identical sampling rate, i.e. 10 MHz.

Other access technologies (e.g., License Assisted Access (LAA) or New Radio (NR)) may need to detect non-safety ITS in addition to safety ones, depending on local regulations. In such case a detector C with L=19 may also be needed in addition to detectors A and B.

In order to successfully detect a preamble the output of the "delay and correlate" algorithm may need to exhibit a plateau for a certain number of consecutive samples (the exact details are of course up to implementation). The following cases have been simulated and the output of the delay and correlate algorithm has been analyzed:

1. The output of detector A (802.11p) upon reception of the IEEE 802.11p preamble
2. The output of detector B (LTE-ITS safety) upon reception of the LTE-ITS safety detection sequence
3. The output of detector C (LTE-ITS non-safety) upon reception of the LTE-ITS non-safety detection sequence
4. The output of detector B (LTE-ITS safety) upon reception of the IEEE 802.11p preamble
5. The output of detector C (LTE-ITS non-safety) upon reception of the IEEE 802.11p preamble
6. The output of detector (802.11p) upon reception of the LTE-ITS safety detection sequence
7. The output of detector A (802.11p) upon reception of the LTE-ITS non-safety detection sequence
8. The output of detector C (LTE-ITS non-safety) upon reception of the LTE-ITS safety detection sequence
9. The output of detector B (LTE-ITS safety) upon reception of the LTE-ITS safety detection sequence It has been observed that case 1), 2) and 3) provide the desired plateau output (the LTE-ITS plateau is longer because of the different signal length). The cross-correlation outputs by 4)-9) are very low as desired, which implies low false-detection probabilities.

Methods and Apparatus

Figure 9:
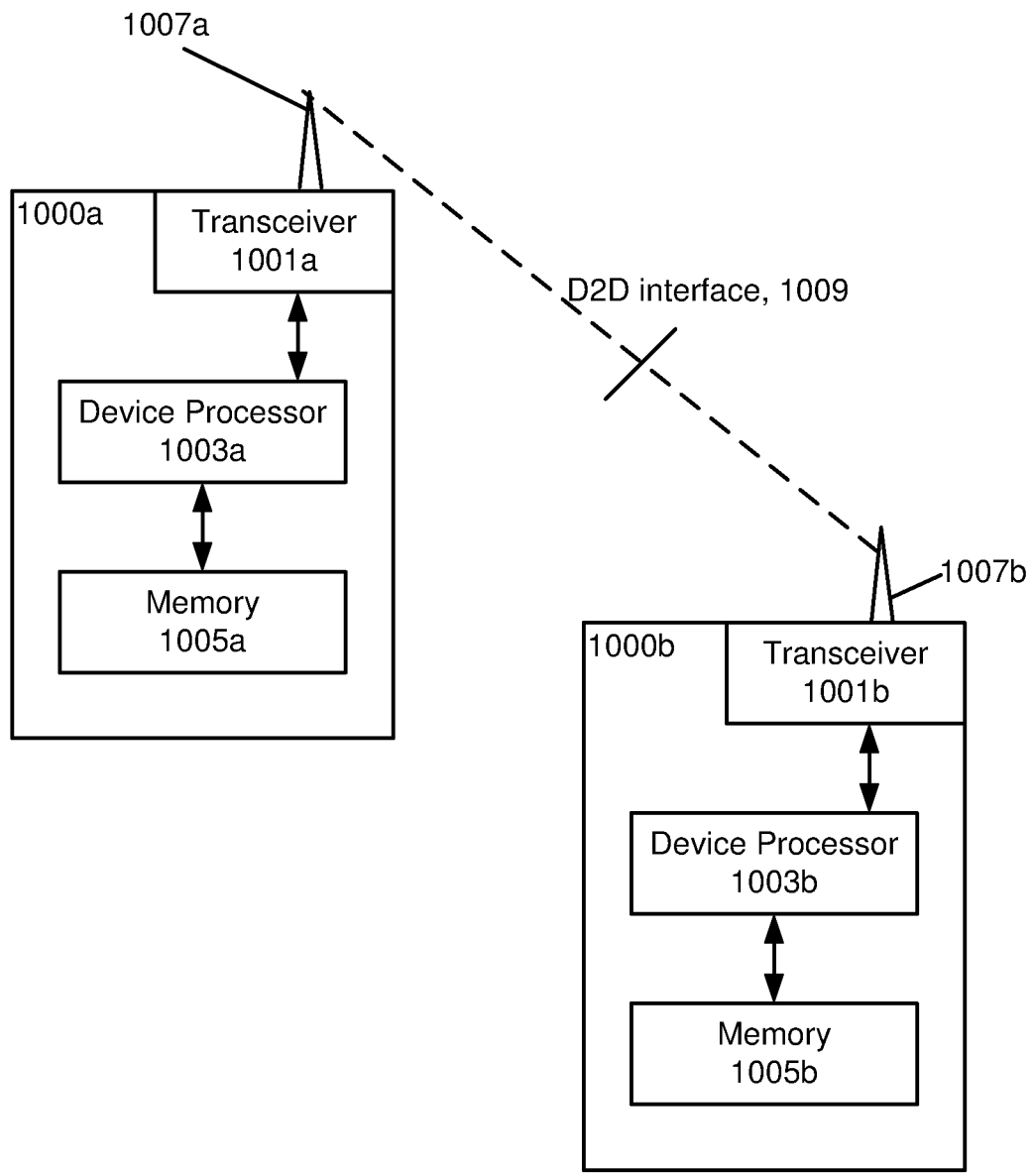
FIG. 9 is a block diagram illustrating two wireless devices in D2D communication.
Figure 10:
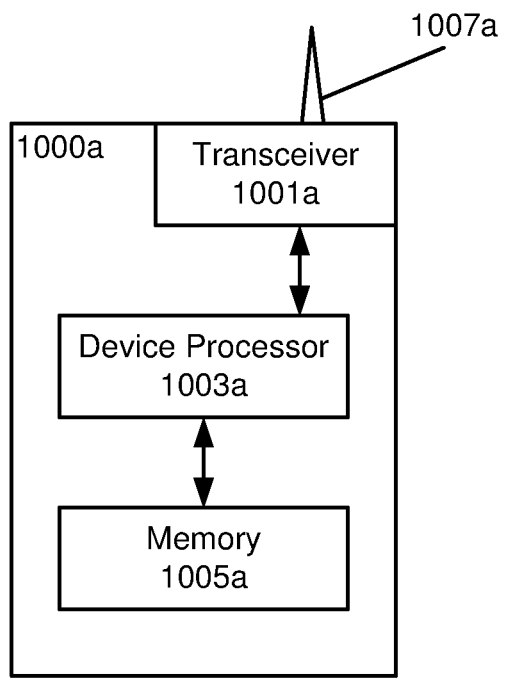
FIG. 10 is a block diagram illustrating a wireless device according to some embodiments of inventive concepts.

Although wireless communication devices, also referred to as wireless devices, disclosed herein may represent communication devices that include any suitable combination of hardware and/or software, these wireless communication devices may, in certain embodiments, represent devices such as an example wireless communication device illustrated in greater detail by FIGS. 9 and 10. Referring to FIGS. 9 and 10, a wireless communication device 1000*a*, 1000*b* may include a processor 1003*a*, 1003*b*, a memory 1005*a*, 1005*b*, a transceiver 1001*a*, 1001*b*, and an antenna 1007*a*, 1007*b*. In certain embodiments, some or all of the functionality described as being provided by wireless devices, UEs, and/or any other types of wireless communication devices may be provided by the device processor 1003*a*, 1003*b* executing instructions stored on a computer-readable medium, such as the memory 1005*a*, 1005*b* shown in FIGS. 9 and 10. Alternative embodiments may include additional components beyond those shown in FIGS. 9 and 10 that may be responsible for providing certain aspects of the device's functionality, including any of the functionality described herein. Wireless device 1003*a*, 1003*b*, for example, may also include an interface, such as a user interface, coupled with processor 1003*a*, 1003*b*.

FIG. 9 illustrates how two wireless devices 1000*a* and 1000*b* communicate wirelessly over a D2D interface 1009 in a D2D communication. The detection sequences of embodiments of the invention are thus signaled between wireless devices over the D2D interface 1009. The D2D interface may be a sidelink or PC5 interface. The detection sequences may be signaled in a transmission interval of the D2D communication. For LTE, the detection sequence may be comprised in a subframe of the D2D communication, and for IEEE802.11p the detection sequence may be comprised in a packet of the D2D communication.

Figure 16:
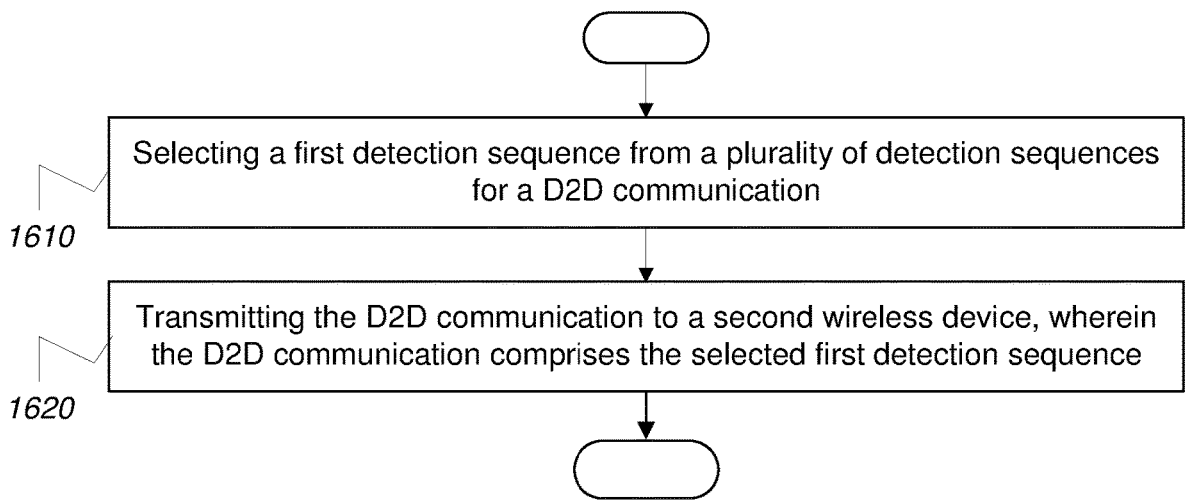
FIG. 16 is a flowchart of a method in a first wireless device according to embodiments.

FIG. 16 is a flowchart illustrating one embodiment of a method for D2D communication. The method is performed by a first wireless device 1000*a*. The method comprises:

1610: Selecting a first detection sequence from a plurality of detection sequences for the D2D communication, wherein each detection sequence of the plurality of detection sequences is associated with at least one of:
  a respective different radio access technology of a plurality of radio access technologies so that the selected first detection sequence identifies one of the plurality of radio access technologies associated with the D2D communication, and
  a respective different service type of a plurality of service types so that the first detection sequence identifies one of the plurality of service types associated with the D2D communication.

The method further comprises:

1620: Transmitting the D2D communication to a second wireless device 1000*b*, wherein the D2D communication comprises the selected first detection sequence. Transmitting the D2D communication may comprise transmitting a subframe of the D2D communication comprising the selected first detection sequence, e.g. when the first wireless device is an LTE UE. Transmitting the D2D communication may alternatively comprise transmitting a packet of the D2D communication comprising the selected first detection sequence, e.g. when the first wireless device is an IEEE802.11p device.

Figure 17:
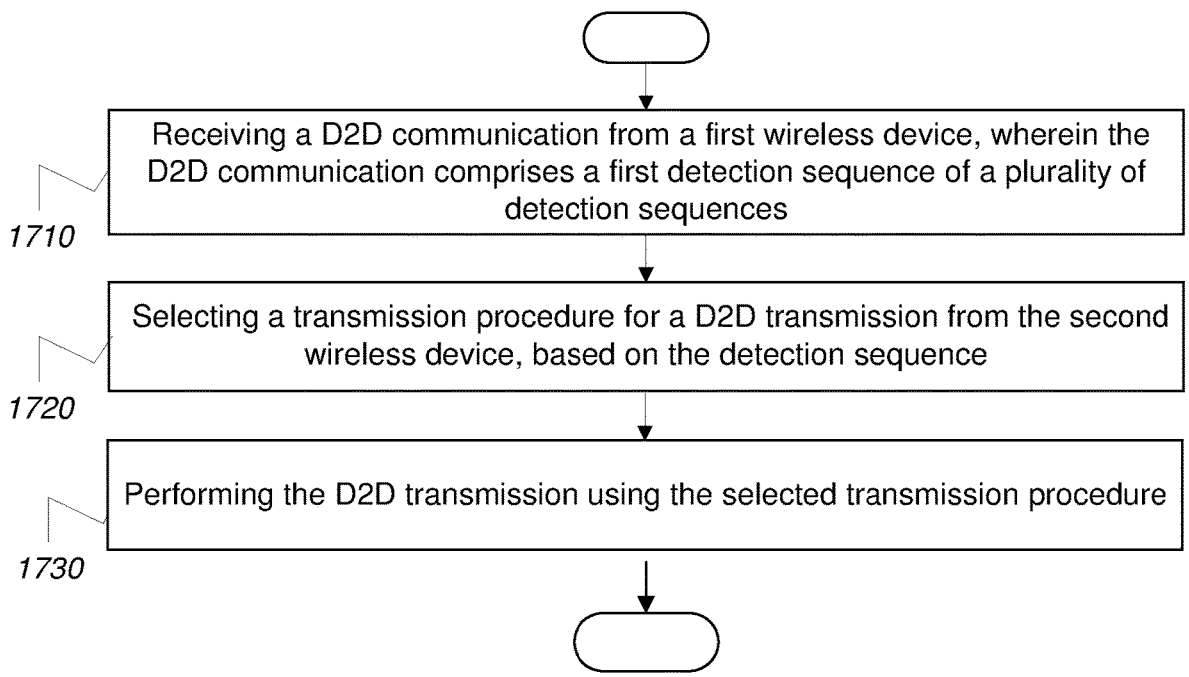
FIG. 17 is a flowchart of a method in a second wireless device according to embodiments.

FIG. 17 is a flowchart illustrating one embodiment of a method for D2D communication. The method is performed by a second wireless device 1000*b*. The method comprises:

1710: Receiving a D2D communication from a first wireless device, wherein the D2D communication comprises a first detection sequence of a plurality of detection sequences. Each detection sequence of the plurality of detection sequences is associated with at least one of:
  a respective different radio access technology of a plurality of radio access technologies so that the first detection sequence identifies a radio access technology of the plurality of radio access technologies associated with the D2D communication from the first wireless device, and
  a respective different service type of a plurality of service types so that the first detection sequence identifies a service type of the plurality of service types associated with the D2D communication from the first wireless device.

1720: Based on the first detection sequence, selecting a transmission procedure for a D2D transmission from the second wireless device.

1730: Performing the D2D transmission using the selected transmission procedure.

As described previously, receiving 1710 the D2D communication may comprise receiving a subframe of the D2D communication comprising the first detection sequence, or receiving a packet of the D2D communication comprising the first detection sequence.

The methods illustrated in FIGS. 16 and 17 thus correspond to the signaling or transmission of a detection sequence of a D2D communication, for the purpose of allowing a fair co-existence between different ITS technologies using different protocols for accessing a channel, as previously described. The methods allow for a dynamic splitting of channels between access technologies or service types rather than a dynamic coexistence on shared channels. An LTE sidelink communication on a certain channel can be detected by a wireless device through the detection sequence identifying that the channel is used for an LTE sidelink communication, and the wireless device may thus decide whether to use the channel for its own D2D communication based on what access technology it wants to use for this D2D communication.

In embodiments of the method illustrated in FIG. 17, the selecting of the transmission procedure may comprise selecting the transmission procedure based on at least one of:
  a radio access technology used for the D2D transmission from the second device, and the radio access technology identified by the first detection sequence associated with the D2D communication from the first wireless device, and
  a service type of the D2D transmission from the second device, and the service type identified by the first detection sequence associated with the D2D communication from the first wireless device.

In further embodiments of the method illustrated in FIG. 17, the selecting of the transmission procedure may comprise selecting a same channel as, or a different channel than, a channel used for the D2D communication from the first wireless device, and the performing the D2D transmission may then comprise performing the D2D transmission using the selected channel. In embodiments, selecting the transmission procedure may comprise selecting the same channel as the channel used for the D2D communication from the first wireless device, when the radio access technology used for the D2D transmission from the second wireless device corresponds to the radio access technology identified by the first detection sequence, and selecting a different channel than the channel used for the D2D communication from the first wireless device otherwise. In other alternative or supplementary embodiments, selecting the transmission procedure may comprise selecting the same channel as the channel used for the D2D communication from the first wireless device, when the service type used for the D2D transmission from the second wireless device corresponds to the service type identified by the first detection sequence, and selecting a different channel than the channel used for the D2D communication from the first wireless device otherwise. This enables the dynamic splitting of channels between radio access technologies or service types. The second wireless device may select a channel for its future D2D transmission that is already used for D2D communication using a same radio access technology or service type as the sidelink or D2D transmission that it is about to perform.

In embodiments of any of the above described methods, at least one detection sequence of the plurality of detection sequences may be characterized by contiguous time repetitions of a subsequence with a respective different subsequence length. There may be a mix of different types of detection sequences among the plurality of detection sequences, where some of them are based on repetitions of a subsequence and some are not. In one embodiment of the method performed by the second wireless device, receiving the D2D communication from the first wireless device may comprise detecting the first detection sequence as contiguous time repetitions of a subsequence of a certain subsequence length. As described previously, the preamble for IEEE802.11p comprises a first sequence which is a repetition of subsequences of 16 samples. A delay offset, also referred to as a time offset, of $L=16$ samples is used for detection of the first sequence of the preamble. Similarly, example embodiments of an LTE-ITS detection sequence described previously may comprise a time repetition of subsequences of a length of 19 or 22 samples, and the delay offset $L=19$ or $L=22$ would be used for detection in that case, thus allowing for a differentiation between the sequence of the IEEE802.11p preamble and the LTE-ITS detection sequences.

In embodiments, detecting the first detection sequence may comprise the following:
  generating a replica of a portion of the received D2D communication,
  delaying the replica of the portion of the received D2D communication by a first time offset,
  comparing the portion of the received D2D communication with the delayed replica of the portion of the received D2D communication, and
  detecting the first detection sequence responsive to a correlation of the portion of the received D2D communication and the delayed replica of the portion of the received D2D communication.

The advantage of the embodiments using detection sequences characterized by contiguous time repetitions of a subsequence with a respective different subsequence length, is that the impact on a conventional LTE transmitter and an IEEE802.11p receiver implementation is small when it comes to generating and detecting a detection sequence designed accordingly. The transmitter needs to be able to generate and transmit detection sequences, e.g. s1 and s2, that makes it possible or a receiver to detect the different detection sequences using different delay offsets for a delay-and-correlate algorithm The receiver receives a sequence r, and in order to detect whether r corresponds to a detection sequence s1 or s2, the receiver will correlate r with its two delayed versions r1 and r2:
  Sequence r1 is r delayed by offset d1 corresponding to s1
  Sequence r2 is r delayed by offset d2 corresponding to s2
  If r and r1 have good correlation then the receiver concludes that s1 was sent, and if r and r2 have good correlation then the receiver concludes that s2 was sent.

In embodiments of the above described methods, each detection sequence of the plurality of detection sequences may occupy a respective different portion of a bandwidth of the D2D communication. Another or an additional way of differentiating between detection sequences is thus to determine in what portion of the bandwidth they are being sent. This corresponds to the second example embodiment described above in the section "Design of detection sequences".

In embodiments of the above described methods, when the D2D communication is a transmission/reception of a subframe of the D2D communication, in e.g. an LTE system, the first detection sequence may be included in a symbol of the subframe of the D2D communication from the first wireless device, wherein a timing offset defines a beginning of the detection sequence relative to a beginning of the symbol of the subframe of the D2D communication. The advantage of this embodiment, illustrated in FIG. 7, is to avoid consistent interference between detection sequences transmitted from different wireless devices.

In embodiments of the above described methods, the first detection sequence may be included in an initial symbol or a final symbol of the subframe of the D2D communication.

In embodiments of the above described methods, the first detection sequence may be included in an initial portion of the initial or final symbol of the subframe of the D2D communication.

In embodiments of the above described methods, the first detection sequence may be included in a final portion of the final symbol of the subframe of the D2D communication.

In embodiments of the above described methods, the plurality of radio access technologies may comprise radio access technologies of an LTE communication network, a 5th Generation communication network such as an NR communication network, and a 802.11p communication network.

In embodiments of the above described methods, the plurality of service types may comprise service types of different priorities, or safety and non-safety service types.

An embodiment of the first wireless device 1000a configured for D2D communication is schematically illustrated in the block diagram in FIG. 9. The first wireless device is adapted to select a first detection sequence from a plurality of detection sequences for the D2D communication, wherein each detection sequence of the plurality of detection sequences is associated with at least one of:
  a respective different radio access technology of a plurality of radio access technologies so that the selected first detection sequence identifies one of the plurality of radio access technologies associated with the D2D communication, and a respective different service type of a plurality of service types so that the first detection sequence identifies one of the plurality of service types associated with the D2D communication.

The first wireless device is further adapted to transmit the D2D communication to a second wireless device 1000b, wherein the D2D communication comprises the selected first detection sequence. The first wireless device may be adapted to transmit the D2D communication by transmitting a subframe of the D2D communication comprising the selected first detection sequence, e.g. when the first wireless device is an LTE UE. In embodiments of the first wireless device, at least one detection sequence of the plurality of detection sequences may be characterized by contiguous time repetitions of a subsequence with a respective different subsequence length.

An embodiment of the second wireless device 1000b configured for D2D communication is also schematically illustrated in the block diagram in FIG. 9. The second wireless device is adapted to receive a D2D communication from the first wireless device 1000a, wherein the D2D communication comprises a first detection sequence of a plurality of detection sequences. The second wireless device may be adapted to receive the D2D communication by receiving a subframe of the D2D communication comprising the first detection sequence.

Each detection sequence of the plurality of detection sequences is associated with at least one of:
- a respective different radio access technology of a plurality of radio access technologies so that the first detection sequence identifies a radio access technology of the plurality of radio access technologies associated with the D2D communication from the first wireless device, and
- a respective different service type of a plurality of service types so that the first detection sequence identifies a service type of the plurality of service types associated with the D2D communication from the first wireless device.

The second wireless device is further adapted to, based on the first detection sequence, select a transmission procedure for a D2D transmission from the second wireless device, and perform the D2D transmission using the selected transmission procedure.

The second wireless device may be adapted to select the transmission procedure by selecting the transmission procedure based on at least one of:
- a radio access technology used for the D2D transmission from the second device, and the radio access technology identified by the first detection sequence associated with the D2D communication from the first wireless device, and
- a service type of the D2D transmission from the second device, and the service type identified by the first detection sequence associated with the D2D communication from the first wireless device.

The second wireless device may be further adapted to select the transmission procedure by selecting a same channel as or a different channel than a channel used for the D2D communication from the first wireless device. The second wireless device may also be adapted to perform the D2D transmission by performing the D2D transmission using the selected channel.

The second wireless device may in embodiments be adapted to select the transmission procedure by selecting the same channel as the channel used for the D2D communication from the first wireless device, when the radio access technology used for the D2D transmission from the second wireless device corresponds to the radio access technology identified by the first detection sequence, and by selecting a different channel than the channel used for the D2D communication from the first wireless device otherwise.

In embodiments, the second wireless device may be adapted to select the transmission procedure by selecting the same channel as the channel used for the D2D communication from the first wireless device, when the service type used for the D2D transmission from the second wireless device corresponds to the service type identified by the first detection sequence, and by selecting a different channel than the channel used for the D2D communication from the first wireless device otherwise.

In embodiments of the second wireless device, at least one detection sequence of the plurality of detection sequences may be characterized by contiguous time repetitions of a subsequence with a respective different subsequence length. The second wireless device may be adapted to receive the D2D communication from the first wireless device by being adapted to detect the first detection sequence as contiguous time repetitions of a subsequence of a certain subsequence length. The second wireless device may be further adapted to detect the first detection sequence by generating a replica of a portion of the received D2D communication, delaying the replica of the portion of the received D2D communication by a first time offset, comparing the portion of the received D2D communication with the delayed replica of the portion of the received D2D communication, and detecting the first detection sequence responsive to a correlation of the portion of the received D2D communication and the delayed replica of the portion of the received D2D communication.

In embodiments of either the first or the second wireless device, each detection sequence of the plurality of detection sequences may occupy a respective different portion of a bandwidth of the D2D communication. Furthermore, when receiving the D2D communication comprises receiving a subframe of the D2D communication, the first detection sequence may be included in a symbol of the subframe of the D2D communication from the first wireless device, and a timing offset may define a beginning of the detection sequence relative to a beginning of the symbol of the subframe of the D2D communication.

In further embodiments of either the first or the second wireless device, the first detection sequence may be included in an initial symbol or a final symbol of the subframe of the D2D communication. The first detection sequence may further be included in an initial portion of the initial or final symbol of the subframe of the D2D communication. Alternatively, the first detection sequence may be included in a final portion of the final symbol of the subframe of the D2D communication.

In any of the above described embodiments of the wireless device, the plurality of radio access technologies may comprises radio access technologies of an LTE communication network, a 5th Generation communication network, and a 802.11p communication network.

The plurality of service types may comprise service types of different priorities, or safety and non-safety service types.

In another embodiment also illustrated in FIG. 9, the first wireless device 1000a may comprise a transceiver 10001a configured to provide wireless communication over a radio interface 1009 and a processing circuitry 1003a coupled to the transceiver, wherein the processing circuitry is configured to:

select a first detection sequence from a plurality of detection sequences for the D2D communication, wherein each detection sequence of the plurality of detection sequences is associated with at least one of:
  a respective different radio access technology of a plurality of radio access technologies so that the selected first detection sequence identifies one of the plurality of radio access technologies associated with the D2D communication, and
  a respective different service type of a plurality of service types so that the first detection sequence identifies one of the plurality of service types associated with the D2D communication,
transmit the D2D communication to a second wireless device, wherein the D2D communication comprises the selected first detection sequence.

In other embodiments of the first wireless device, the processing circuitry may be further configured to perform the method as previously described with reference to FIG. 16.

The second wireless device 1000b, may comprise a transceiver 1001b configured to provide wireless communication over a radio interface 1009 and a processing circuitry 1003b coupled to the transceiver, wherein the processing circuitry is configured to:
receive a D2D communication from a first wireless device, wherein the D2D communication comprises a first detection sequence of a plurality of detection sequences, wherein each detection sequence of the plurality of detection sequences is associated with at least one of:
  a respective different radio access technology of a plurality of radio access technologies so that the first detection sequence identifies a radio access technology of the plurality of radio access technologies associated with the D2D communication from the first wireless device, and
  a respective different service type of a plurality of service types so that the first detection sequence identifies a service type of the plurality of service types associated with the D2D communication from the first wireless device,
based on the first detection sequence, select a transmission procedure for a D2D transmission from the second wireless device, and
perform the D2D transmission using the selected transmission procedure.

In other embodiments of the second wireless device, the processing circuitry may be further configured to perform the method as previously described with reference to FIG. 17.

In still another embodiment, the first wireless device may comprise:
a selection module adapted to select a first detection sequence from a plurality of detection sequences for the D2D communication, wherein each detection sequence of the plurality of detection sequences is associated with at least one of:
  a respective different radio access technology of a plurality of radio access technologies so that the selected first detection sequence identifies one of the plurality of radio access technologies associated with the D2D communication, and
  a respective different service type of a plurality of service types so that the first detection sequence identifies one of the plurality of service types associated with the D2D communication,
a transmitting module adapted to transmit the D2D communication to a second wireless device, wherein the D2D communication comprises the selected first detection sequence.

In other embodiments, the first wireless device may comprise modules for performing the method as previously described with reference to FIG. 16.

Furthermore, the second wireless device may comprise:
a receiving module adapted to receive a D2D communication from a first wireless device, wherein the D2D communication comprises a first detection sequence of a plurality of detection sequences, wherein each detection sequence of the plurality of detection sequences is associated with at least one of:
  a respective different radio access technology of a plurality of radio access technologies so that the first detection sequence identifies a radio access technology of the plurality of radio access technologies associated with the D2D communication from the first wireless device, and
  a respective different service type of a plurality of service types so that the first detection sequence identifies a service type of the plurality of service types associated with the D2D communication from the first wireless device,
a selecting module adapted to, based on the first detection sequence, select a transmission procedure for a D2D transmission from the second wireless device, and
a transmitting module adapted to perform the D2D transmission using the selected transmission procedure.

In other embodiments, the second wireless device may comprise modules for performing the method as previously described with reference to FIG. 17.

Further Embodiments and Definitions

Figure 12:
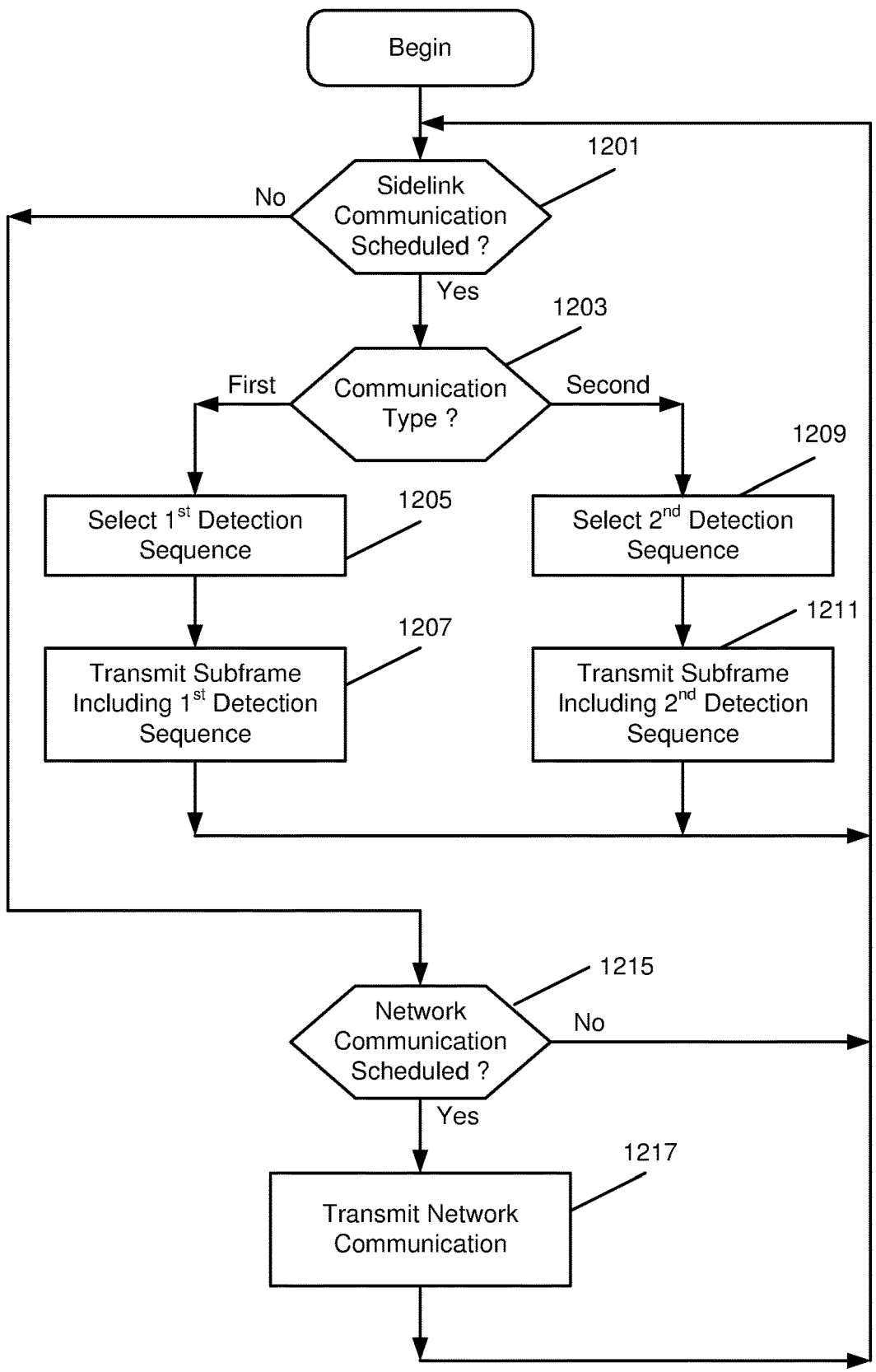
FIG. 12 is a flow chart illustrating wireless device operations according to some embodiments of inventive concepts.
Figure 13:
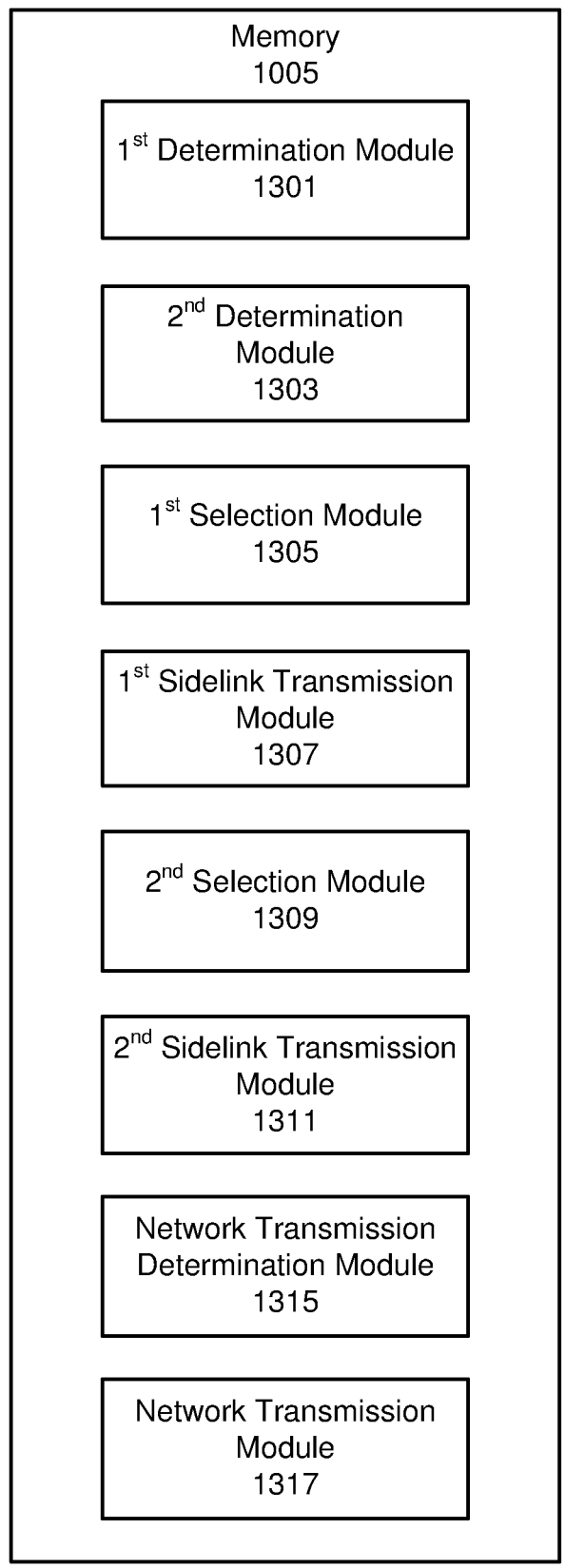
FIG. 13 illustrates memory including modules for operations of FIG. 12.

Operations of a wireless device 1000 will now be discussed with reference to the flow chart of FIG. 12 and the modules of FIG. 13. For example, modules of FIG. 13 may be stored in wireless device memory 1005 of FIG. 10, and these modules may provide instructions so that when the instructions of a module are executed by processor 1003, processor 1003 performs respective operations of the flow chart of FIG. 12.

At block 1201, processor 1003 may determine that that a subframe of a first sidelink communication (e.g., a first direct device-to-device sidelink communication) is scheduled for transmission (e.g., using instructions of first determination module 1301). At block 1203, processor 1003 may determine whether the first sidelink communication is a sidelink communication of a first or second type (e.g., using instructions of second determination module 1303). Responsive to the first sidelink communication being a sidelink communication of a first type at block 1203, processor may select the first detection sequence from a plurality of detection sequences for the sidelink communication at block 1205 (e.g., using instructions of first selection module 1305), and transmit the scheduled subframe of the sidelink communication including the first detection sequence through transceiver 1001 (e.g., using instructions of first sidelink transmission module 1307).

At block 1201, processor 1003 may determine that a subframe of a second sidelink communication (e.g., a second direct device-to-device sidelink communication) is scheduled for transmission (e.g., using instructions of first determination module 1301). At block 1203, processor 1003 may determine whether the second sidelink communication is a sidelink communication of a first or second type (e.g., using instructions of second determination module 1303). Responsive to the second sidelink communication being a sidelink communication of a second type at block 1203, processor 1003 may select the second detection sequence from the plurality of detection sequences for the second sidelink communication at block 1209 (e.g., using instructions of second selection module 1309), and transmit the scheduled subframe of the second sidelink communication including the second detection sequence through transceiver 1001 (e.g., using instructions of second sidelink transmission module 1311).

At block 1215, processor 1003 may determine that a subframe of a network communication (e.g., a communication for a wireless mobile network, such as an LTE network) is scheduled for transmission (e.g., using instructions of network transmission determination module 1315). Responsive to determining that a subframe of a network communication is scheduled at block 1215, processor 1003 may transmit the subframe of the network communication through transceiver 1001 to a network base station for communication with another user device (e.g., a wireless or wired user communication device) at block 1217 (e.g., using instructions of network transmission module 1317).

Further Example Embodiments

Embodiment 1. A method providing sidelink communications from a wireless device, the method comprising:

selecting a detection sequence from a plurality of detection sequences for the sidelink communication; and transmitting a subframe of the sidelink communication from the wireless device, wherein the subframe includes the detection sequence.

Embodiment 2. The method of Embodiment 1 wherein the sidelink communication is a first sidelink communication, and wherein the detection sequence is a first detection sequence, the method further comprising:

selecting a second detection sequence from the plurality of detection sequences for a second sidelink communication; and transmitting a subframe of the second sidelink communication from the wireless device, wherein the subframe of the second sidelink communication includes the second detection sequence.

Embodiment 3. The method of Embodiment 2 wherein each detection sequence is characterized by contiguous time repetitions of a subsequence, wherein the first and second detection sequences have respective first and second subsequence lengths, and wherein the first and second subsequence lengths are different.

Embodiment 4. The method of any of Embodiments 2-3 wherein the first and second detection sequences have a respective first and second detection sequence bandwidths, and wherein the subframes of the first and second sidelink communications have a same subframe bandwidth that is different than the first and second detection sequence bandwidths.

Embodiment 5. The method of Embodiment 4 wherein the first and second detection sequences occupy different portions of the subframe bandwidth.

Embodiment 6. The method of any of Embodiments 4-5 wherein the first detection sequence occupies a lowest portion of the subframe bandwidth of the subframe of the first sidelink communication, and wherein the second detection sequence occupies a highest portion of the subframe bandwidth of the subframe of the second sidelink communication.

Embodiment 7. The method of any of Embodiments 2-6 wherein the first detection sequence is included in a symbol of the subframe of the first sidelink communication, wherein a first timing offset is provided for a beginning of the first detection sequence relative to a beginning of the symbol of the subframe of the first sidelink communication, wherein the second detection sequence is included in a symbol of the subframe of the second sidelink communication, wherein a second timing offset is provided for a beginning of the second detection sequence relative to a beginning of the symbol of the subframe of the second sidelink communication, and wherein the first and second timing offsets are different.

Embodiment 8. The method of any of Embodiments 2-7 wherein the first detection sequence is included in an initial symbol of the subframe of the first sidelink communication, and wherein the second detection sequence is included in an initial symbol of the subframe of the second sidelink communication.

Embodiment 9. The method of Embodiment 8 wherein the first detection sequence is included in an initial portion of the initial symbol of the subframe of the first sidelink communication, and wherein the second detection sequence is included in an initial portion of the initial symbol of the subframe of the second sidelink communication.

Embodiment 10. The method of any of Embodiments 2-7 wherein the first detection sequence is included in a final symbol of the subframe of the first sidelink communication, and wherein the second detection sequence is included in a final symbol of the subframe of the second sidelink communication.

Embodiment 11. The method of Embodiment 10 wherein the first detection sequence is included in an initial portion of the final symbol of the subframe of the first sidelink communication, and wherein the second detection sequence is included in an initial portion of the final symbol of the subframe of the second sidelink communication.

Embodiment 12. The method of Embodiment 10 wherein the first detection sequence is included in a final portion of the final symbol of the subframe of the first sidelink communication, and wherein the second detection sequence is included in a final portion of the final symbol of the subframe of the second sidelink communication.

Embodiment 13. The method of any of Embodiments 2-12 wherein the respective subframes of the first and second sidelink communications are transmitted over respective first and second channels, wherein the first and second channels are different.

Embodiment 14. The method of any of Embodiments 2-13 wherein the respective subframes of the first and second sidelink communications are transmitted over a same channel.

Embodiment 15. The method of any of Embodiments 2-14 wherein the first sidelink communication has a first priority, wherein the second sidelink communication has a second priority, and wherein the first and second priorities are different.

Embodiment 16. The method of any of Embodiments 2-15 wherein the first sidelink communication comprises an intelligent transportation system safety communication, and wherein the second sidelink communication comprises an intelligent transportation system non-safety communication.

Embodiment 17. The method of any of Embodiments 2-16 wherein the first and second sidelink communications comprises first and second direct device-to-device sidelink communications, the method further comprising:

transmitting a network communication through a network base station for communication with another user device, wherein transmitting the first and second sidelink communications comprises transmitting the first and second sidelink communications as first and second direct device-to-device sidelink communications without relaying through a network base station.

Embodiment 18. The method of Embodiment 17 wherein the network communication comprises a Long Term Evolution network communication.

Embodiment 19. The method of any of Embodiments 2-18 wherein the first and second sidelink communications comprise first and second Long Term Evolution intelligent transportation system communications.

Embodiment 20. The method of any of Embodiments 1-19 wherein each detection sequence of the plurality of detection sequences is associated with a respective different radio access technology of a plurality of radio access technologies so that the detection sequence of the subframe identifies one of the plurality of radio access technologies associated with the sidelink communication.

Embodiment 21. The method of Embodiment 20 wherein a first one of the plurality of radio access technologies is a first radio access technology selected from Long Term Evolution, $5^{th}$ Generation, and/or 802.11p, wherein a second one of the plurality of radio access technologies is a second radio access technology selected from Long Term Evolution, $5^{th}$ Generation, and/or 802.11p, and wherein the first and second radio access technologies are different, and wherein the detection sequence identifies the first radio access technology.

Embodiment 22. The method of any of Embodiments 1-19 wherein each detection sequence of the plurality of detection sequences is associated with a respective different service type of a plurality of service types so that the detection sequence of the subframe identifies one of the plurality of service types associated with the sidelink communication.

Embodiment 23. The method of Embodiment 22 wherein a first one of the plurality of service types is a first priority service type, wherein a second one of the plurality of service types is a second priority service type, and wherein the first and second priorities are different, and wherein the detection sequence identifies the first priority service type.

Embodiment 24. The method of any of Embodiments 22-23 wherein a first one of the plurality of service types is a safety service type, and wherein a second one of the plurality of service types is a non-safety service type.

Embodiment 25. The method of any of Embodiments 1-24 wherein the detection sequence is included in a first portion of a symbol of the subframe, and wherein a second portion of the symbol of the subframe includes data and/or control information.

Embodiment 26. The method of Embodiments 25 wherein the first portion of the symbol precedes the second portion of the symbol.

Embodiment 27. The method of Embodiment 25 wherein the second portion of the symbol precedes the first portion of the symbol.

Embodiment 28. The method of any of Embodiments 25-27 wherein the symbol is an initial symbol of the subframe.

Embodiment 29. The method of any of Embodiments 25-27 wherein the symbol is a final symbol of the subframe.

Embodiment 30. The method of any of Embodiments 2-29 wherein the first sidelink communication comprises a communication for a first radio access technology, and wherein the second sidelink communication comprises a communication for a second radio access technology.

Embodiment 31. A wireless device comprising:

a transceiver configured to provide wireless communication over a radio interface; and a processor coupled to the transceiver, wherein the processor is configured to perform operations according to any of Embodiments 1-30.

Embodiment 32. A wireless device adapted to perform according to any of Embodiments 1-30.

Embodiment 33. A wireless device comprising modules adapted to perform according to any of Embodiments 1-30.

Embodiment 34. A method of operating a radio communication node, the method comprising:

receiving a portion of a first sidelink communication including a first detection sequence;

based on the first detection sequence, determining that the first sidelink communication has a first communication type;

receiving a portion of a second sidelink communication including a second detection sequence, wherein the first and second detection sequences are different; and based on the second detection sequence, determining that the second sidelink communication has a second communication type different than the first communication type.

Embodiment 35. A method according to Embodiment 34 wherein receiving the portion of the first sidelink communication comprises detecting the first detection sequence based on contiguous time repetitions of a subsequence of the first detection sequence having a first length, and wherein receiving the portion of the second sidelink communication comprises detecting the second detection sequence based on contiguous time repetitions of a subsequence of the second detection sequence having a second length.

Embodiment 36. A method according to Embodiment 35:
wherein detecting the first detection sequence comprises,
generating a replica of a portion of the first detection sequence,
delaying the replica of the portion of the first detection sequence by a first time offset,
comparing the portion of the first detection sequence with the delayed replica of the portion of the first detection sequence, and
detecting the first detection sequence responsive to a correlation of the portion of the first detection sequence and the delayed replica of the portion of the first detection sequence; and
wherein detecting the second detection sequence comprises,
generating a replica of a portion of the second detection sequence,
delaying the replica of the portion of the second detection sequence by a second time offset different than the first time offset,
comparing the portion of the second detection sequence with the delayed replica of the portion of the second detection sequence, and
detecting the second detection sequence responsive to a correlation of the portion of the second detection sequence and the delayed replica of the portion of the second detection sequence.

Embodiment 37. The method of any of Embodiments 34-36 wherein each of the first and second detection sequences is characterized by contiguous time repetitions of a subsequence, wherein the first and second detection sequences have respective first and second subsequence lengths, and wherein the first and second subsequence lengths are different.

Embodiment 38. The method of any of Embodiments 34-37 wherein the first and second detection sequences have a respective first and second detection sequence bandwidths, wherein the portions of the first and second sidelink communications have a same sidelink communication bandwidth that is different than the first and second detection sequence bandwidths, and wherein the first and second detection sequences occupy different portions of the sidelink communication bandwidth.

Embodiment 39. The method of Embodiment 38 wherein the first detection sequence occupies a lowest portion of the sidelink communication bandwidth of the first sidelink communication, and wherein the second detection sequence occupies a highest portion of the sidelink communication bandwidth of the second sidelink communication.

Embodiment 40. The method of any of Embodiments 34-39 wherein the first detection sequence is included in a symbol of a subframe of the first sidelink communication, wherein a first timing offset is provided for a beginning of the first detection sequence relative to a beginning of the symbol of the subframe of the first sidelink communication, wherein the second detection sequence is included in a symbol of a subframe of the second sidelink communication, wherein a second timing offset is provided for a beginning of the second detection sequence relative to a beginning of the symbol of the subframe of the second sidelink communication, and wherein the first and second timing offsets are different.

Embodiment 41. The method of any of Embodiments 34-40 wherein the first detection sequence is included in an initial symbol of a subframe of the first sidelink communication, and wherein the second detection sequence is included in an initial symbol of a subframe of the second sidelink communication.

Embodiment 42. The method of Embodiment 41 wherein the first detection sequence is included in an initial portion of the initial symbol of the subframe of the first sidelink communication, and wherein the second detection sequence is included in an initial portion of the initial symbol of the subframe of the second sidelink communication.

Embodiment 43. The method of any of Embodiments 34-40 wherein the first detection sequence is included in a final symbol of a subframe of the first sidelink communication, and wherein the second detection sequence is included in a final symbol of a subframe of the second sidelink communication.

Embodiment 44. The method of Embodiment 43 wherein the first detection sequence is included in an initial portion of the final symbol of the subframe of the first sidelink communication, and wherein the second detection sequence is included in an initial portion of the final symbol of the subframe of the second sidelink communication.

Embodiment 45. The method of Embodiment 43 wherein the first detection sequence is included in a final portion of the final symbol of the subframe of the first sidelink communication, and wherein the second detection sequence is included in a final portion of the final symbol of the subframe of the second sidelink communication.

Embodiment 46. The method of any of Embodiments 34-45 wherein the respective subframes of the first and second sidelink communications are received over respective first and second channels, wherein the first and second channels are different.

Embodiment 47. The method of any of Embodiments 34-46 wherein the respective subframes of the first and second sidelink communications are received over a same channel.

Embodiment 48. The method of any of Embodiments 34-47 wherein the first sidelink communication has a first priority, wherein the second sidelink communication has a second priority, and wherein the first and second priorities are different.

Embodiment 49. The method of any of Embodiments 34-48 wherein the first sidelink communication comprises an intelligent transportation system safety communication, and wherein the second sidelink communication comprises an intelligent transportation system non-safety communication.

Embodiment 50. The method of any of Embodiments 34-49 wherein the first and second sidelink communications comprise first and second Long Term Evolution intelligent transportation system communications.

Embodiment 51. The method of any of Embodiments 34-50 wherein the first detection sequence identifies a first radio access technology associated with the first sidelink communication, wherein the second detection sequence identifies a second radio access technology associated with the second sidelink communication, and wherein the first and second radio access technologies are different.

Embodiment 52. The method of Embodiment 51 wherein each of the first and second radio access technologies is selected from Long Term Evolution, $5^{th}$ Generation, and/or 802.11p.

Embodiment 53. The method of any of Embodiments 34-50 wherein the first detection sequence identifies a first service type associated with the first sidelink communication, wherein the second detection sequence identifies a second service type associated with the second sidelink communication, and wherein the first and second service types are different.

Embodiment 54. The method of Embodiment 53 wherein the first service type is a first priority service type, wherein the second service type is a second priority service type, and wherein the first and second priorities are different.

Embodiment 55. The method of any of Embodiments 53-54 wherein the first service type is a safety service type, and wherein the second service type is a non-safety service type.

Embodiment 56. The method of any of Embodiments 34-55 wherein the first detection sequence is included in a first portion of a symbol of the subframe of the first sidelink communication, and wherein a second portion of the symbol of the subframe of the first sidelink communication includes data and/or control information.

Embodiment 57. The method of Embodiments 56 wherein the first portion of the symbol of the first sidelink communication precedes the second portion of the symbol.

Embodiment 58. The method of Embodiment 56 wherein the second portion of the symbol of the first sidelink communication precedes the first portion of the symbol.

Embodiment 59. The method of any of Embodiments 56-58 wherein the symbol is an initial symbol of the subframe of the first sidelink communication.

Embodiment 60. The method of any of Embodiments 56-58 wherein the symbol is a final symbol of the subframe of the first sidelink communication.

Embodiment 61. The method of any of Embodiments 34-60 wherein the first sidelink communication comprises a communication for a first radio access technology, and wherein the second sidelink communication comprises a communication for a second radio access technology.

Embodiment 62. The method of any of Embodiments 34-61 further comprising:

responsive to determining that the first sidelink communication has the first communication type, transmitting a first communication from the radio communication node using a first transmission procedure; and responsive to determining that the first sidelink communication has the second communication type, transmitting a second communication from the radio communication node using a second transmission procedure different than the first transmission procedure.

Embodiment 63. The method of Embodiment 62:

wherein transmitting the first communication using the first transmission procedure comprises transmitting the first communication using a channel different than a channel used for the first sidelink communication; and wherein transmitting the second communication using the second transmission procedure comprises transmitting the second communication using a delay and then transmitting the second communication using the channel used for the second sidelink communication.

Embodiment 64. The method of any of Embodiments 34-63 wherein the first and second sidelink communications are received from respective first and wireless devices, and wherein the first and second wireless devices are different wireless devices.

Embodiment 65. A radio communication node comprising:

a transceiver configured to provide wireless communication over a radio interface; and a processor coupled to the transceiver, wherein the processor is configured to perform operations according to any of Embodiments 34-64.

Embodiment 66. A radio communication node adapted to perform according to any of Embodiments 34-64.

Embodiment 67. A communication node comprising modules adapted to perform according to any of Embodiments 34-64.

Figure 11:
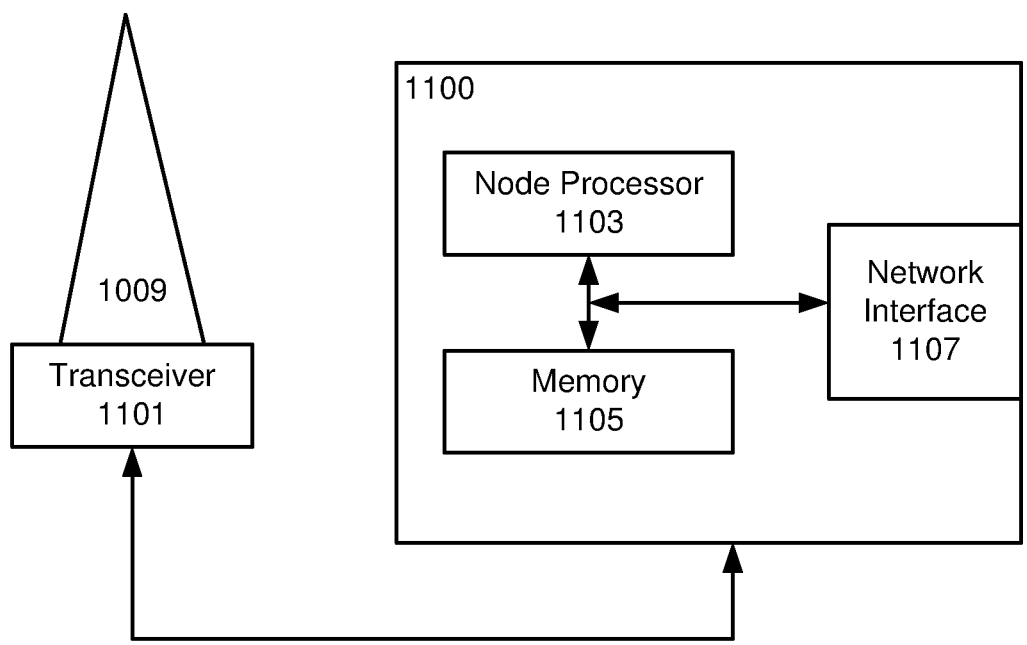
FIG. 11 is a block diagram illustrating a radio communication node according to some embodiments of inventive concepts.

Although the illustrated radio communication nodes may represent network nodes that include any suitable combination of hardware and/or software, these nodes may, in particular embodiments, represent devices such as the example radio communication node illustrated in greater detail by FIG. 11.

Referring to FIG. 11, a radio communication node 1100 may include a node processor 1103, a memory 1105, a network interface 1107, a transceiver 1101, and an antenna 1109. In certain embodiments, some or all of the functionality described as being provided by a radio communication node such as an IEEE 802.11p base station and/or any other type of network node may be provided by node processor 1103 executing instructions stored on a computer-readable medium, such as memory 1105 shown in FIG. 11. Alternative embodiments of radio communication node 1100 may comprise additional components to provide additional functionality, such as the functionality described herein and/or related supporting functionality.

Figure 14:
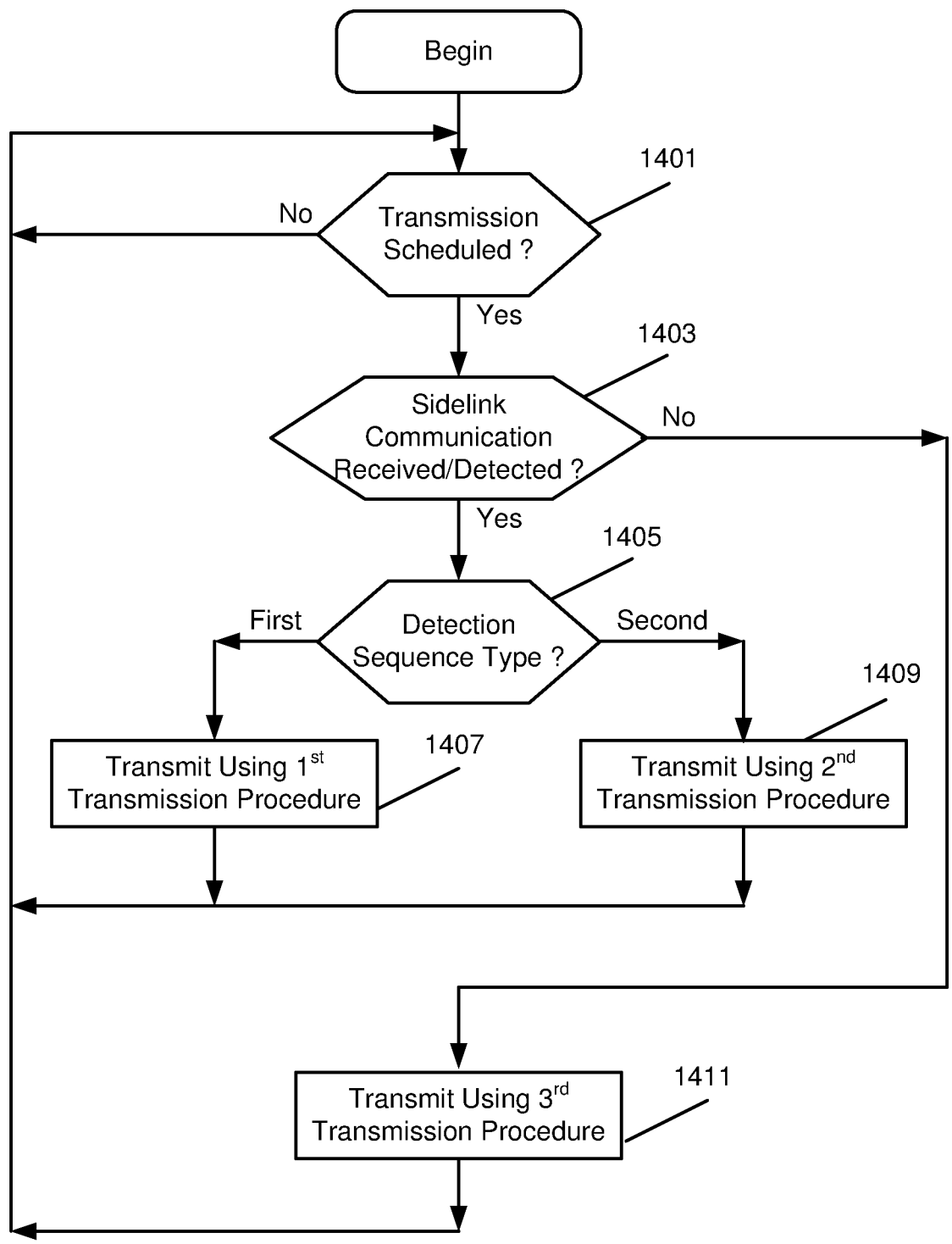
FIG. 14 is a flow chart illustrating communication node operations according to some embodiments of inventive concepts.
Figure 15:
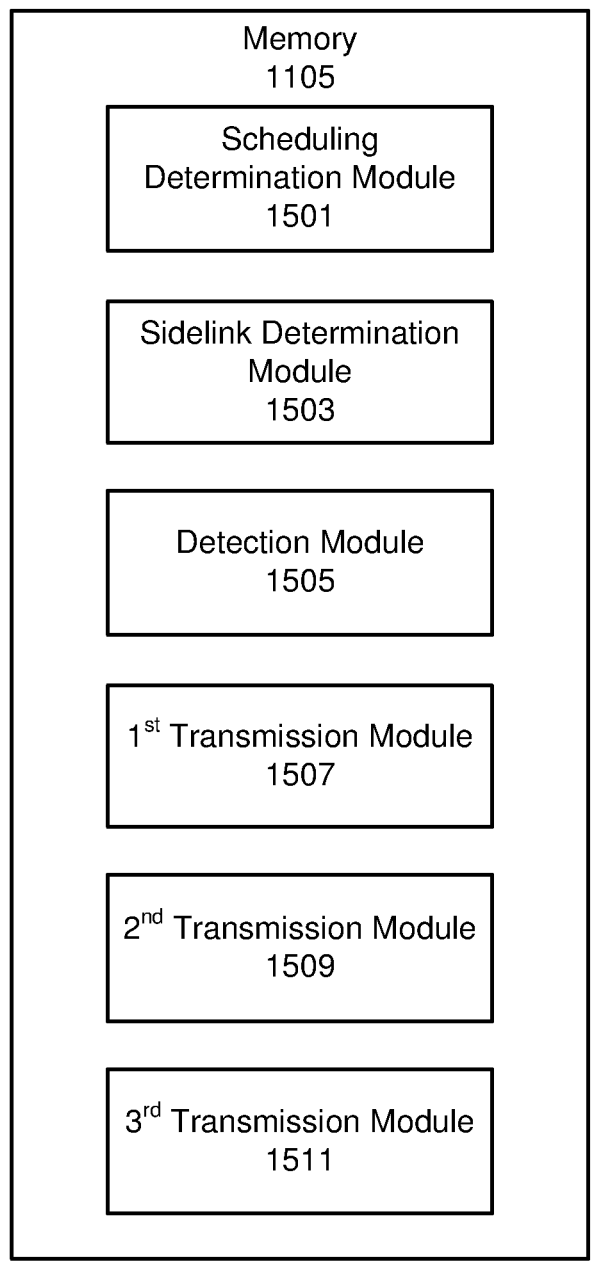
FIG. 15 illustrates memory including modules for operations of FIG. 14.

Operations of a communication node 1100 will now be discussed with reference to the flow chart of FIG. 14 and the modules of FIG. 15. For example, modules of FIG. 15 may be stored in memory 1105 of FIG. 11, and these modules may provide instructions so that when the instructions of a module are executed by processor 1103, processor 1103 performs respective operations of the flow chart of FIG. 14.

At block 1401, processor 1103 may determine that a first transmission is scheduled (e.g., a transmission according to the IEEE 802.11p standard) at block 1401 (e.g., using instructions of scheduling determination module 1501). At block 1403, processor 1103 may determine if a sidelink communication is received/detected (e.g., using instructions of sidelink determination module 1503). If a sidelink communication is received/detected at block 1403 (e.g., through transceiver 1101), processor 1103 may receive a portion of a first sidelink communication including a first detection sequence through transceiver 1101, and based on the first detection sequence being of a first type, processor 1103 may determine that the first sidelink communication has a first communication type at block 1405 (e.g., using instructions of detection module 1505). Responsive to determining that the first sidelink communication has the first communication type, processor 1103 may transmit the scheduled communication (e.g., according to the 802.11p standard) through transceiver 1101 using a first transmission procedure at block 1407 (e.g., using first transmission module 1507).

At block 1401, processor 1103 may determine that a second transmission is scheduled (e.g., a transmission according to the IEEE 802.11p standard) at block 1401 (e.g., using instructions of scheduling determination module 1501). At block 1403, processor 1103 may determine if a sidelink communication is received/detected (e.g., using instructions of sidelink determination module 1503). If a sidelink communication is received/detected at block 1403 (e.g., through transceiver 1101), processor 1103 may receive a portion of a second sidelink communication including a second detection sequence through transceiver 1101, and based on the second detection sequence being of a first type, processor 1103 may determine that the second sidelink communication has a second communication type at block 1405 (e.g., using instructions of detection module 1505). Responsive to determining that the second sidelink communication has the second communication type, processor 1103 may transmit the second scheduled communication (e.g., according to the 802.11p standard) through transceiver 1101 using a second transmission procedure at block 1409 (e.g., using first transmission module 1509).

At block 1401, processor 1103 may determine that a third transmission is scheduled (e.g., a transmission according to the IEEE 802.11p standard) at block 1401 (e.g., using instructions of scheduling determination module 1501). At block 1403, processor 1103 may determine if a sidelink communication is received/detected (e.g., using instructions of sidelink determination module 1503). If a sidelink communication is not received/detected at block 1403 (so that no interfering communications are detected), processor 1103 may transmit the third scheduled communication (e.g., according to the 802.11p standard) through transceiver 1101 using a third transmission procedure at block 1411 (e.g., using third transmission module 1511).

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for Device-to-Device, D2D, communication, the method being performed by a first wireless device, the method comprising:
   selecting a first detection sequence from a plurality of detection sequences for the D2D communication, wherein each detection sequence of the plurality of detection sequences is associated with at least one of:
   a respective different radio access technology of a plurality of radio access technologies so that the selected first detection sequence identifies one of the plurality of radio access technologies associated with the D2D communication, and
   a respective different service type of a plurality of service types so that the first detection sequence identifies one of the plurality of service types associated with the D2D communication, and the method further comprising:
  transmitting the D2D communication to a second wireless device, wherein the D2D communication comprises the selected first detection sequence,
  wherein at least one detection sequence of the plurality of detection sequences is characterized by contiguous time repetitions of a subsequence with a respective different subsequence length.

2. The method according to claim 1, wherein transmitting the D2D communication comprises transmitting a subframe of the D2D communication comprising the selected first detection sequence.

3. The method according to claim 2, wherein the first detection sequence is included in a symbol of the subframe of the D2D communication from the first wireless device, and wherein a timing offset defines a beginning of the detection sequence relative to a beginning of the symbol of the subframe of the D2D communication.

4. The method according to claim 3, wherein the first detection sequence is included in an initial symbol or a final symbol of the subframe of the D2D communication.

5. The method according to claim 4, wherein the first detection sequence is included in an initial portion of the initial or final symbol of the subframe of the D2D communication.

6. The method according to claim 4, wherein the first detection sequence is included in a final portion of the final symbol of the subframe of the D2D communication.

7. The method according to claim 1, wherein the plurality of radio access technologies comprises radio access technologies of a Long Term Evolution communication network, a $5^{th}$ Generation communication network, and a 802.11p communication network.

8. A method for Device-to-Device, D2D, communication, the method being performed by a second wireless device, the method comprising:
  receiving a D2D communication from a first wireless device, wherein the D2D communication comprises a first detection sequence of a plurality of detection sequences, wherein each detection sequence of the plurality of detection sequences is associated with at least one of:
    a respective different radio access technology of a plurality of radio access technologies so that the first detection sequence identifies a radio access technology of the plurality of radio access technologies associated with the D2D communication from the first wireless device, and
    a respective different service type of a plurality of service types so that the first detection sequence identifies a service type of the plurality of service types associated with the D2D communication from the first wireless device, and
  based on the first detection sequence, selecting a transmission procedure for a D2D transmission from the second wireless device, and
  performing the D2D transmission using the selected transmission procedure,
  wherein at least one detection sequence of the plurality of detection sequences is characterized by contiguous time repetitions of a subsequence with a respective different subsequence length.

9. The method according to claim 8, wherein selecting the transmission procedure comprises selecting the transmission procedure based on at least one of:
  a radio access technology used for the D2D transmission from the second device, and the radio access technology identified by the first detection sequence associated with the D2D communication from the first wireless device, and
  a service type of the D2D transmission from the second device, and the service type identified by the first detection sequence associated with the D2D communication from the first wireless device.

10. The method according to claim 8, wherein selecting the transmission procedure comprises selecting a same channel as or a different channel than a channel used for the D2D communication from the first wireless device, and wherein performing the D2D transmission comprises performing the D2D transmission using the selected channel.

11. The method according to claim 10, wherein selecting the transmission procedure comprises selecting the same channel as the channel used for the D2D communication from the first wireless device, when the radio access technology used for the D2D transmission from the second wireless device corresponds to the radio access technology identified by the first detection sequence, and selecting a different channel than the channel used for the D2D communication from the first wireless device otherwise.

12. The method according to claim 10, wherein selecting the transmission procedure comprises selecting the same channel as the channel used for the D2D communication from the first wireless device, when the service type used for the D2D transmission from the second wireless device corresponds to the service type identified by the first detection sequence, and selecting a different channel than the channel used for the D2D communication from the first wireless device otherwise.

13. The method according to claim 8, wherein receiving the D2D communication from the first wireless device comprises detecting the first detection sequence as contiguous time repetitions of a subsequence of a certain subsequence length.

14. The method according to claim 13, wherein detecting the first detection sequence comprises:
  generating a replica of a portion of the received D2D communication,
  delaying the replica of the portion of the received D2D communication by a first time offset,
  comparing the portion of the received D2D communication with the delayed replica of the portion of the received D2D communication, and
  detecting the first detection sequence responsive to a correlation of the portion of the received D2D communication and the delayed replica of the portion of the received D2D communication.

15. The method according to claim 1, wherein each detection sequence of the plurality of detection sequences occupies a respective different portion of a bandwidth of the D2D communication.

16. The method according to claim 8, wherein receiving the D2D communication comprises receiving a subframe of the D2D communication comprising the first detection sequence.

17. A first wireless device configured for D2D communication, the first wireless device comprising a transceiver configured to provide wireless communication over a radio interface and a processing circuitry coupled to the transceiver, wherein the processing circuitry is configured to:
  select a first detection sequence from a plurality of detection sequences for the D2D communication, wherein each detection sequence of the plurality of detection sequences is associated with at least one of:

a respective different radio access technology of a plurality of radio access technologies so that the selected first detection sequence identifies one of the plurality of radio access technologies associated with the D2D communication, and a respective different service type of a plurality of service types so that the first detection sequence identifies one of the plurality of service types associated with the D2D communication, transmit the D2D communication to a second wireless device, wherein the D2D communication comprises the selected first detection sequence, wherein at least one detection sequence of the plurality of detection sequences is characterized by contiguous time repetitions of a subsequence with a respective different subsequence length.

18. A second wireless device configured for D2D communication, the second wireless device comprising a transceiver configured to provide wireless communication over a radio interface and a processing circuitry coupled to the transceiver, wherein the processing circuitry is configured to:

receive a D2D communication from a first wireless device, wherein the D2D communication comprises a first detection sequence of a plurality of detection sequences, wherein each detection sequence of the plurality of detection sequences is associated with at least one of:

a respective different radio access technology of a plurality of radio access technologies so that the first detection sequence identifies a radio access technology of the plurality of radio access technologies associated with the D2D communication from the first wireless device, and a respective different service type of a plurality of service types so that the first detection sequence identifies a service type of the plurality of service types associated with the D2D communication from the first wireless device, based on the first detection sequence, select a transmission procedure for a D2D transmission from the second wireless device, and perform the D2D transmission using the selected transmission procedure, wherein at least one detection sequence of the plurality of detection sequences is characterized by contiguous time repetitions of a subsequence with a respective different subsequence length.

* * * * *